US005597405A

United States Patent [19]

Grigoryan et al.

[11] Patent Number: 5,597,405

[45] Date of Patent: Jan. 28, 1997

[54] MAGNETIC COMPOSITION, MAGNETIC TONER AND INK CONTAINING THE MAGNETIC COMPOSITION

[75] Inventors: Leonid S. Grigoryan, 2-3-6-104, Higashi, Tsukuba-shi, Ibaraki-ken, Tsukuba; Kyuya Yakushi, Okazaki, both of Japan

[73] Assignees: Ricoh Company, Ltd., Tokyo; Leonid S. Grigoryan, Tsukuba; Kyuya Yakushi, Okazaki, all of Japan

[21] Appl. No.: 568,687

[22] Filed: Dec. 7, 1995

Related U.S. Application Data

[62] Division of Ser. No. 395,316, Feb. 28, 1995, Pat. No. 5,506,079.

[30] Foreign Application Priority Data

Feb. 28, 1994 [JP] Japan .................................... 6-054530

[51] Int. Cl.$^6$ .................................................... C09D 11/00

[52] U.S. Cl. .................. 106/20 R; 106/20 B; 106/21 A; 106/23 B; 106/23 K; 106/30 C; 106/311

[58] Field of Search ............................... 106/20 R, 20 B, 106/21 A, 23 B, 23 K, 30 C, 311

[56] References Cited

U.S. PATENT DOCUMENTS

| | | | |
|---|---|---|---|
| 4,401,470 | 8/1983 | Bridger | 106/20 R |
| 4,563,301 | 1/1986 | Marks et al. | 252/519 |
| 4,973,391 | 11/1990 | Madou et al. | 204/78 |
| 5,281,261 | 1/1994 | Lin | 106/20 R |

*Primary Examiner*—Hoa Van Le

*Attorney, Agent, or Firm*—Oblon, Spivak, McClelland, Maier & Neustadt, P.C.

[57] ABSTRACT

A magnetic composition contains an alkali-metal-doped tetraazaporphyrin derivative which is prepared by doping a tetraazaporphyrin derivative of formula (I) with an alkali metal, or an alkali-metal-doped porphyrin derivative which is prepared by doping porphyrin derivative of formula (II) with an alkali metal:

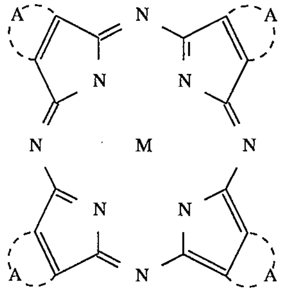

(I)

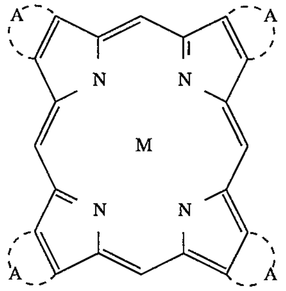

(II)

wherein M represents at least one metal or a plurality of metals; and A represents two individual hydrogen atoms, or a condensation substituent. A magnetic toner and a magnetic ink contain the above magnetic composition as the magnetic component thereof.

6 Claims, 15 Drawing Sheets

MAGNETIC COMPOSITION, MAGNETIC TONER AND INK CONTAINING THE MAGNETIC COMPOSITION

This is a division of application Ser. No. 08/395,316, filed on Feb. 28, 1995, now U.S. Pat. No. 5,506,079.

BACKGROUND OF THE INVENTION

1. Field of the Invention

The present invention relates to a magnetic composition, more particularly to an organic magnetic composition comprising an alkali-metal-doped tetraazaporphyrin derivative or an alkali-metal-doped porphyrin derivative, for example, for use in magnetic toners and inks.

The present invention also relates to a magnetic toner comprising the organic magnetic composition for developing latent electrostatic images in electrophotography, electrostatic recording and electrostatic printing; and to a magnetic ink comprising the organic magnetic composition, for use with ink jet printers, hot-melt printers and thermal image transfer ink ribbons, and for use with instruments for writing in general use.

The magnetic composition of the present invention can also be employed as an absorbing material, a shielding material, a material for a filter, and also can be employed in an ultra-high-frequency apparatus, and a magnetism-controlling apparatus.

2. Discussion of Background

Magnetic materials are widely used, for example, as magnetic materials with high magnetic permeability such as permanent magnet; magnetostrictive materials; and acoustic materials, in various fields such as the fields of electric and electronic appliances, automobiles, appliances for medical service, communication apparatus, and materials for magnetic recording.

Organic magnetic materials have various advantages over inorganic magnetic materials, in particular, in that organic magnetic materials have smaller densities than those of inorganic magnetic materials, and exhibit better dispersibilities in binder agents than those of inorganic magnetic materials, and that many of organic magnetic materials assume a white or light pale color. Thus, recently, great attention has been paid to the development of such organic magnetic materials.

More specifically, as such organic magnetic materials, there have been reported, for example, a black powder-like polymer which was obtained by heating 4,4'-(butadiyne-1,4-diyl)-bis(2,2,6,6-tetramethyl-4-hydroxy-piperidine-1-oxyl) or subjecting the same to ultraviolet-light irradiation [Korshak et al., Nature 326 370 (1987)], a black insoluble polymer obtained by polymerizing 1,3,5-triaminobenzene by use of iodine [Torrance, Synth. Metal, 19 709 (1987)], and polycarbene [Iwamura et al., Chemical Society of Japan, 1987, No. 4595].

These organic magnetic materials, however, are difficult to synthesize and have problems in the reproducibility of the syntheses thereof. Furthermore, only several percents of the moieties of these organic magnetic materials exhibit ferromagnetism, and the temperatures at which these organic magnetic materials exhibit magnetism are extremely low. In addition, these organic magnetic materials are unstable in air, so that they still have problems to be solved as magnetic materials for use in practice.

Ohtani et al. have proposed in Japanese Laid-Open Patent Applications 62-521 and 62-522 an organic magnetic material comprising a polycondensate of fused polynuclear aromatics resin (COPNA) which was synthesized from a condensed polycyclic aromatic compound by use of p-xylene glycol. They have further proposed in Japanese Laid-Open Patent Application 62-282080 an organic magnetic material comprising a thermosetting resin having higher heat resistance than that of the above-mentioned polycondensate of fused polynuclear aromatics resin (COPNA), which was prepared by replacing the p-xylene glycol with benzaldehyde or benzenedialdehyde in the procedure of the synthesis of the polycondensate of fused polynuclear aromatics resin (COPNA).

It has been reported that the above-mentioned organic magnetic materials exhibit ferromagnetism at room temperature. However, it has been found that the polymeric structures of the above resins are not known exactly and the reproducibility of the exhibition of the ferro-magnetism of the above resins is extremely poor.

As organic magnetic materials of a metal complex type, there have been synthesized polynuclear metal complexes of a different-metal alternate coordination type, having a one or more dimensional chain structure, for example, as disclosed in Japanese Laid-Open Patent Application 4-74193, J. Am. Chem. Soc., 110, 782 (1988), and J. Chem. Soc., Chem. Commun., 642 (1988).

L. S. Grigoryan et al. (L. S. Grigoryan is one of the joint co-inventors of the present invention) have already reported that organic magnetic materials were synthesized by doping metal-phthalocyanine by alkali metals.

Furthermore, a magnetic polymer complex salt, PPH-$H_2SO_4$, in which PPH stands for poly(2,6-pyridinediyl methylidene nitrilohexamethylene nitrilomethylidene), has been synthesized by allowing PPH to react with ferrous sulfate, as disclosed in Japanese Laid-Open Patent Applications 1-118515, 1-96215, 1-96216, 1-99217, 2-55765, 63-205666, 1-277251, 1-277252, 1-277253, 4-191091, and Solid State Physics Vol. 18, No. 5 (1983).

By use of a tetraazaporphyrin derivative which is employed as a moiety of the alkali-metal-doped tetraazaporphyrin derivative for use in the present invention, it has been tried to synthesize a magnetic polytetraazaporphyrin iron complex, for instance, as disclosed in Japanese Laid-Open Patent Application 62-192383, and a charge-transfer type magnetic material as disclosed in Adv. Mater., 498 (1992).

These magnetic materials, however, have lower Curie temperatures than that of the magnetic composition of the present invention, and exhibit extremely poor reproducibility of the ferromagnetism at room temperature, so that these magnetic materials cannot be employed in practice.

As mentioned previously, magnetic materials are widely employed in various fields. For example, magnetic materials are employed in magnetic toners.

A magnetic toner is employed as a developer for a development method using a mono-component magnetic toner for developing latent electrostatic images formed on an electrophotographic photoconductor which is composed of an electroconductive support and a photoconductive layer provided thereon, or on an electrostatic recording medium which is composed of an electroconductive support and a dielectric layer provided thereon.

In this development method, an electroconductive magnetic toner is held on an electroconductive and non-magnetic carrier sleeve through an inner magnet which is built within the carrier sleeve, and the magnetic toner is transferred onto latent electrostatic images formed on a latent-electrostatic-image bearing member comprising an electroconductive support, by the relative movement of the carrier sleeve and the magnet.

When the magnetic toner is thus transferred onto the latent electrostatic images, electroconductive paths are formed between the electroconductive support of the latent-electrostatic-image bearing member and the carrier sleeve, and also between the electroconductive support and the magnetic toner, so that electric charges with a polarity opposite to that of the latent electrostatic images are induced in the magnetic toner for the development of the latent electrostatic images.

However, an electroconductive toner for use in the above-mentioned charge induction development exhibits poor image transfer performance at high humidities and therefore it is difficult to use plain paper as a transfer sheet for such an electroconductive toner, so that recently a development method using a magnetic toner of a triboelectric charging, high resistivity type is mainly used.

Furthermore, the development method using a mono-component magnetic toner has attracted attention because copying apparatus for use with a mono-component magnetic toner can be reduced in size and cost. In addition, a color development by use of mono-component magnetic toners has also attracted attention in accordance with recent development of multi-color copy image formation methods.

In accordance with the recent remarkable increase of the quantity of information to be handled, there is a strong demand for high speed processing in copying machines and printers.

The magnetic materials can also be used in magnetic inks which are generally composed of a magnetic material, a dye, a vehicle composed of a resin and a carrier medium, and additives. Such magnetic inks are used, for example, in oil inks, aqueous inks, and hot-melt inks. More specifically, inks composed of a magnetic material and an organic solvent such as kerosene or glycerin, or water, in which the magnetic material is dispersed in the form of colloidal particles, are disclosed in Japanese Laid-Open Patent Application 59-147217; and an ink composed of a magnetic material and wax in which the magnetic material is dispersed is disclosed in Japanese Laid-Open Patent Application 62-267379.

Some organic magnetic materials are excellent with respect to the reproducibility of ferromagnetism, but the temperatures at which the excellent reproducibility of ferromagnetism is exhibited are limited to too low temperatures to be used in practice, or the syntheses thereof are too complicated to be used in practice. Other organic magnetic materials exhibit ferromagnetism at room temperature, but the reproducibility of the exhibition of the ferromagnetism at room temperature is too poor to be used in practice. Thus, organic magnetic materials that can be satisfactorily used in practice have not yet been obtained.

In conventional mono-component magnetic toners, inorganic magnetic materials such as ferrite and magnetite are employed as the magnetic materials for the mono-component magnetic toners. A mono-magnetic toner prepared by dispersing such an inorganic magnetic material in a binder resin has the shortcoming that the toner is too fragile to be stirred in a development unit or too fragile to be treated even in a toner production system, because it is extremely difficult to disperse the inorganic magnetic material uniformly in a binder resin.

Furthermore, the densities of the inorganic magnetic materials such as ferrite and magnetite are generally 3 g/cm$^3$ or more, and the magnetic materials for use in the mono-component magnetic toner have a density in a range of 5 to 6 g/cm$^3$. Therefore a mono-component magnetic toner comprising such a magnetic material in an amount in a range of 20 to 80 wt. % has too high a density to handle as a toner and to be stirred in a development unit, and requires a large amount of driving energy. Furthermore, a magnetic toner with such a high density has the problem that it is scattered when rotated with high speed because of the centrifugal force exerted on the toner.

In conventional magnetic inks, a magnetic material therefor comprises a metallic oxide such as ferrite, chromium oxide, a Mn-B alloy, a Mn-Al alloy, an Fe-Ni alloy, or a Sn-Fe alloy, so that the compatibility of such a magnetic material with a vehicle for the magnetic inks is so poor that the magnetic material tends to aggregate and is difficult to be dispersed in the vehicle. Furthermore, images formed by such magnetic inks, when dried, tend to be cracked. In addition, it is difficult for such magnetic inks to have the color of a pigment or dye employed therein because the magnetic materials employed therein have dark colors such as black, dark brown and brown.

SUMMARY OF THE INVENTION

It is therefore a first object of the present invention to provide a magnetic composition, which can be prepared with excellent reproducibility and is capable of exhibiting ferromagnetism at room temperature and magnetic characteristics that can be maintained sufficiently for use in practice, and which can be employed, for example, in a magnetic toner and/or in a magnetic ink.

A second object of the present invention is to provide a magnetic toner free from the shortcomings of the conventional magnetic toners, which is capable of providing not only mono-color images, but full-color images, with excellent image quality, which magnetic toner has such a small and uniform density that is not fragile and therefore facilitates not only the handling thereof as a toner for use in practice, but also the stirring thereof in a development unit, and eliminates the problem of the scattering thereof while in use, even when used in a copy machine with a high speed rotary development sleeve.

A third object of the present invention is to provide a magnetic ink free from the shortcomings of the conventional magnetic inks, which is capable of providing images with excellent image quality, which magnetic ink comprises a magnetic material and a vehicle, with the magnetic material having excellent compatibility with the vehicle and excellent dispersibility in the vehicle, and if a dye or pigment is additionally employed, without the color of the dye or pigment being impaired by the magnetic material.

The first object of the present invention can be achieved by a magnetic composition comprising an alkali-metal-doped tetraazaporphyrin derivative which is prepared by doping a tetraazaporphyrin derivative of formula (I) with an alkali metal, or an alkali-metal-doped porphyrin derivative which is prepared by doping porphyrin derivative of formula (II) with an alkali metal:

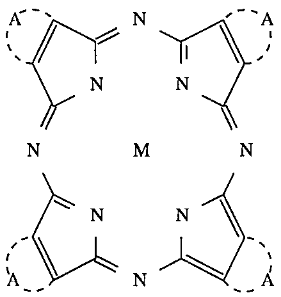
(I)

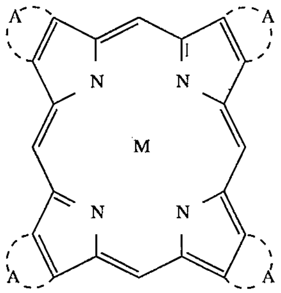
(II)

wherein M represents at least one metal or a metal composition comprising a plurality of metals; and A represents two individual hydrogen atoms or a condensation substituent selected from the group consisting of:

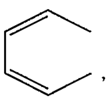
(a)

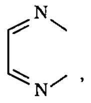
(b)

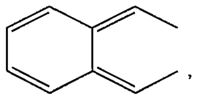
(c)

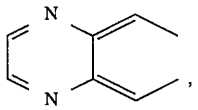
(d)

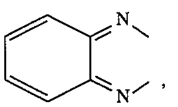
(e)

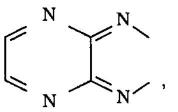
(f)

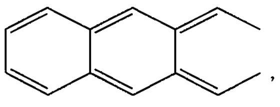
(g)

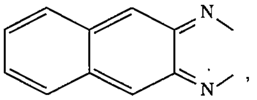
(h)

-continued

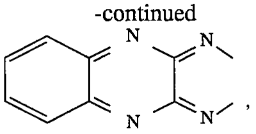
(i)

and

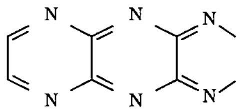
(j)

The second object of the present invention can be achieved by a magnetic toner comprising the above-mentioned alkali-metal-doped tetraazaporphyrin derivative or alkali-metal-doped porphyrin derivative and a binder resin, and if necessary, with a dye or a pigment being contained therein.

The third object of the present invention can be achieved by a magnetic ink comprising the above-mentioned alkali-metal-doped tetraazaporphyrin derivative or alkali-metal-doped porphyrin derivative, and a vehicle, and if necessary, a dye or a pigment being contained therein.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
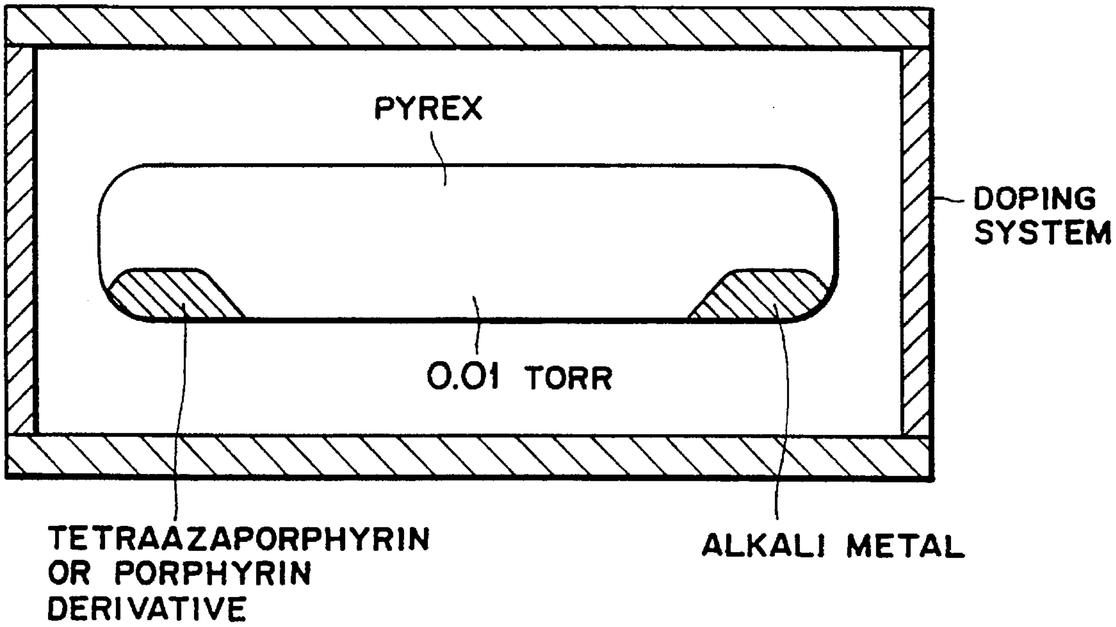
FIG. 1 shows a schematic illustration of a doping system for doping a tetraazaporphyrin derivative or a porphyrin derivative with an alkali metal for the preparation of an alkali-metal-doped tetraazaporphyrin derivative or an alkali-metal doped porphyrin derivative for use in the present invention.

The magnetic composition of the present invention comprises an alkali-metal-doped tetraazaporphyrin derivative which is prepared by doping a tetraazaporphyrin derivative of formula (I) with an alkali metal, or an alkali-metal-doped porphyrin derivative which is prepared by doping a porphyrin derivative of formula (II):

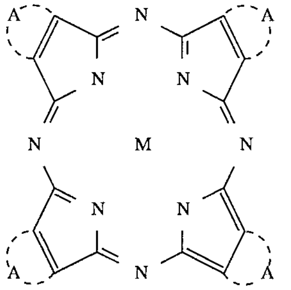

(I)

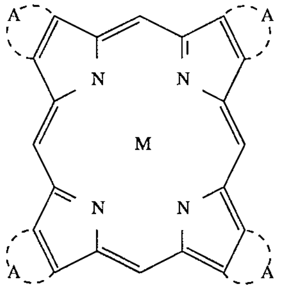

(II)

wherein M represents at least one metal or a metal composition comprising a plurality of metals; and A represents two individual hydrogen atoms or a condensation substituent selected from the group consisting of:

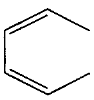

(a)

,

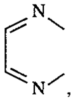

(b)

,

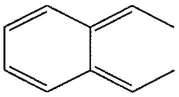

(c)

,

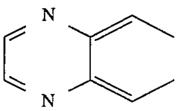

(d)

,

-continued

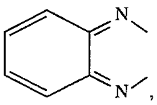

(e)

,

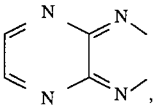

(f)

,

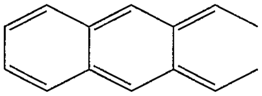

(g)

,

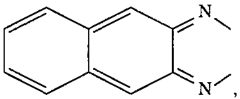

(h)

,

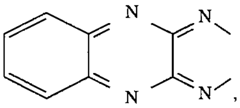

(i)

, and

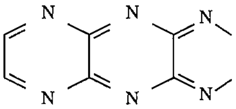

(j)

The color of the alkali-metal-doped tetraazaporphyrin derivative or alkali-metal-doped porphyrin derivative differs depending upon the choice of the above-mentioned condensation substituents.

The above condensation substituent represented by A may have at least one substituent selected from the group consisting of, for example, a halogen atom, an alkyl group, an alkoxy group, an amino group, a nitro group, an aryl group, a carboxyl group, a carboxylate group, an aralkyl group, an alkenyl group, an aryloxy group, an alkylthio group, and an arylthio group.

By replacing any of the above-mentioned substituents and the substitution positions thereof, the light absorption wavelength for the alkali-metal-doped tetraazaporphyrin derivative or alkali-metal-doped porphyrin derivative can also be changed.

The center metal represented by M has the effect of controlling the magnetic characteristics including the types of magnetism and Curie temperature of each of the alkali-metal-doped tetra-azaporphyrin derivative and alkali-metal-doped porphyrin derivative.

Examples of the center metal represented by M include Fe, Co, Ni and Mn. Examples of the metal composition comprising a plurality of metals, represented by M, include Fe/Co, Fe/Ni, Ni/Co, Fe/Pt, Fe/Cd, Fe/Pb, and Fe/Co/Ni.

Other metals can also be employed as the center metal represented by M. However, when the above exemplified metals or the metal compositions are employed, stable ferromagnetism can be obtained at room temperature, with excellent reproducibility of the preparation of the alkali-metal-doped tetraazaporphyrin derivative and alkali-metal-doped porphyrin derivative.

When a metal or metal composition such as Fe, Co, Ni, Mn, Fe/Co, Fe/Ni, Ni/Co, Fe/Pt, Fe/Cd, Fe/Pb, or Fe/Co/Ni is employed as the center metal represented by M for the tetraazaporphyrin derivative or alkali-metal-doped porphyrin derivative, and potassium is employed as the alkali metal for the doping, the obtained alkali-metal-doped tetraazaporphyrin derivative and alkali-metal-doped porphyrin derivative exhibit a ferromagnetic interaction.

The alkali-metal-doped tetraazaporphyrin derivative of formula (I) and the alkali-metal-doped porphyrin derivative of formula (II) for use in the present invention have colors, which depend upon the condensation substituent A, the substituent for the condensation substituent A, the center metal A, the tetraazaporphyrin or porphyrin skeleton, and the alkali metal for the doping of the tetraazaporphyrin derivative or the porphyrin derivative.

Furthermore, the intensity of the magnetism of each of the alkali-metal-doped tetraazaporphyrin derivative and the alkali-metal-doped porphyrin derivative can be controlled by the combination of the center metal represented by M and the alkali metal employed for the doping. Furthermore, by an appropriate combination of the center metal represented by M and the alkali metal, each of the alkali-metal-doped tetraazaporphyrin derivative and the alkali-metal-doped porphyrin can be made so as to be suitable for use in the thin film formation thereof.

When the tetraazaporphyrin derivative of formula (I) and the porphyrin derivative of formula (II) are doped with an alkali metal, one or more kinds of alkali metals can be employed, and it is preferable that the total number of the atoms of the alkali metal be in a range of 1 to 6 per one molecule of each of the tetraazaporphyrin derivative of formula (I) and the porphyrin derivative of formula (II) for obtaining an alkali-metal-doped tetraazaporphyrin derivative and an alkali-metal-doped porphyrin derivative, which are particularly improved with respect to the reproducibility of the preparation thereof and the exhibition of the ferromagnetism at room temperature, and which are suitable for use in magnetic color toners.

In the present invention, the tetraazaporphyrin derivative of formula (I) or the porphyrin derivative of formula (II), each having the center metal represented by M, is doped with any of the above-mentioned alkali metals, whereby spins are generated in the molecule of the tetraazaporphyrin derivative of formula (I) or the porphyrin derivative of formula (II) and ferromagnetism is generated therein. Generally, the generation of the spins does not depend upon the kind of the center metal M, so that any kinds of metals can be employed as the metal M so long as they can be served as the center metal for the tetraazaporphyrin derivative of formula (I) or the porphyrin derivative of formula (II).

In the present invention, it is considered that the ferromagnetism is generated by selective reduction of a degenerate excited state ($e_g$ molecular orbital) of the tetraazaporphyrin derivative of formula (I) or the porphyrin derivative of formula (II). Therefore, it is preferable that the tetraazaporphyrin derivative and the porphyrin derivative for use in the present invention have a $D_4h$ symmetry with respect to the skeleton thereof. Therefore, it is preferable that the $D_4h$ symmetry thereof be taken into consideration when substituents are introduced into the tetraazaporphyrin derivative and porphyrin derivative for use in the present invention.

Furthermore, generally, the larger the molecular weights of the tetraazaporphyrin derivative and porphyrin derivative, the smaller the magnetization thereof per unit weight thereof.

As mentioned previously, the alkali-metal-doped tetraazaporphyrin derivative and alkali-metal-doped porphyrin derivative are respectively prepared by doping the tetraazaporphyrin derivative of formula (I) and the porphyrin derivative of formula (II) with an alkali metal. When necessary, these doped derivatives may be successively subjected to annealing.

It is preferable that this doping process be carried out in a gas phase in a closed system for increasing the yield of the doped product and for obtaining an alkali-metal-doped tetraazaporphyrin derivative and an alkali-metal-doped porphyrin derivative with improved magnetic characteristics.

Furthermore, it is preferable that each of the tetraazaporphyrin derivative of formula (I) and the porphyrin derivative of formula (II) be doped with an alkali metal in such a manner that each derivative is out of contact with the alkali metal with the degree of vacuum and the temperature being maintained appropriately.

As mentioned previously, when the tetraazaporphyrin derivative of formula (I) and the porphyrin derivative of formula (II) are doped with an alkali metal, one or more kinds of alkali metals can be employed, and it is preferable that the total number of the atoms of the alkali metal be in a range of 1 to 6 per one molecule of each of the tetraazaporphyrin derivative of formula (I) and the porphyrin derivative of formula (II) for obtaining an alkali-metal-doped tetra-azaporphyrin derivative and an alkali-metal-doped porphyrin derivative which are particularly improved with respect to the reproducibility of the preparation thereof and the exhibition of the ferromagnetism at room temperature, and which are suitable for use in magnetic color toners.

Specific examples of the above alkali-metal-doped tetraazaporphyrin derivative and alkali-metal-doped porphyrin derivative are prepared by use of two alkali metals, sodium and potassium, with the total number of the atoms of the alkali metals being set at 4 per one molecule of the tetraazaporphyrin derivative of formula (I) or the porphyrin derivative of formula (II).

When potassium is employed as the alkali metal, and an iron phthalocyanine is employed as the tetraazaporphyrin, the above-mentioned doping can be carried out with the molar ratio of the iron phthalocyanine to potassium being set at 1:4.

The doping process for use in the present invention can be carried out in a reaction system as illustrated in FIG. 1.

The tetraazaporphyrin derivative of formula (I) or the porphyrin derivative of formula (II) is placed out of contact with the alkali metal on a pyrex tube in the reaction system as illustrated in FIG. 1, with the degree of vacuum set, for example, at 0.01 torr, and the temperature being maintained appropriately. The temperature slightly differs depending upon the ion radius of the alkali metal employed.

The magnetic toner of the present invention, which comprises the magnetic composition comprising the above-mentioned alkali-metal-doped tetraazaporphyrin derivative or alkali-metal-doped porphyrin derivative and a binder resin, will now be explained in detail.

It is preferable that the magnetic composition be in an amount of 15 to 80 wt. % of the entire weight of the magnetic toner. When necessary, an inorganic magnetic material may be contained in the magnetic toner.

As the binder resin for use in the magnetic toner of the present invention, conventional binder resins for use in conventional toners can be employed.

Specific examples of such binder resins include homopolymers of styrene or substituted styrenes such as polystyrene, polychloroethylene, and polyvinyltoluene; styrene copolymers such as styrene - p-chlorostyrene copolymer, styrene - propylene copolymer, styrene - vinyltoluene copolymer, styrene - vinylnaphthalene copolymer, styrene - methyl acrylate copolymer, styrene - ethyl acrylate copolymer, styrene - butyl acrylate copolymer, styrene - octyl acrylate copolymer, styrene - methyl methacrylate copolymer, styrene - ethyl methacrylate copolymer, styrene - butyl methacrylate copolymer, styrene - methyl α-chloromethacrylate copolymer, styrene - acrylonitrile copolymer, styrene - vinyl methyl ether copolymer, styrene - vinyl ethyl ether copolymer, styrene - vinyl methyl ketone copolymer, styrene - butadiene copolymer, styrene - isoprene copolymer, styrene - acrylonitrile - indene copolymer, styrene - maleic acid copolymer, and styrene - maleic acid ester copolymer; polymethyl methacrylate; polybutyl methacrylate; polyvinyl chloride; polyvinyl acetate; polyethylene; polypropylene; polyester; polyvinyl butyral; polyacrylic resin; rosin; modified rosin; terpene resin; phenolic resin; aliphatic or aliphatic hydrocarbon resin; aromatic petroleum resin; chlorinated paraffin; and paraffin wax. These binder resins can be used alone or in combination.

The molecular weight, molecular weight distribution, cross-linking degree and other properties of each of the above binder resins are selected in accordance with the desired melt viscosity of the magnetic toner to be obtained.

As mentioned previously, the alkali-metal-doped tetraazaporphyrin derivative and alkali-metal-doped porphyrin derivative for use in the present invention have colors, which depend upon the condensation substituent A, the substituent for the condensation substituent A, the center metal A, the tetraazaporphyrin or porphyrin skeleton, and the alkali metal for the doping of the tetraazaporphyrin derivative or the porphyrin derivative.

Therefore, the alkali-metal-doped tetraazaporphyrin derivative and alkali-metal-doped porphyrin derivative for use in the magnetic composition of the present invention can be employed, not only as a magnetic material for the magnetic toner of the present invention, but also as a coloring agent for the magnetic toner.

Specific examples of the colors of the alkali-metal-doped tetraazaporphyrin derivatives with the following tetraazaporphyrin skeleton [I] and alkali-metal-doped porphyrin derivatives with the following porphyrin skeleton [II], with A being 2H or a condensation substituent being selected from the group consisting of the following (a) to (j), the center metal being M, and the alkali metal for the doping being potassium (K), are as shown in the following TABLE 1:

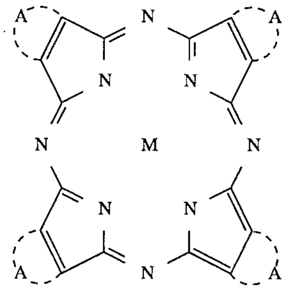

[I]

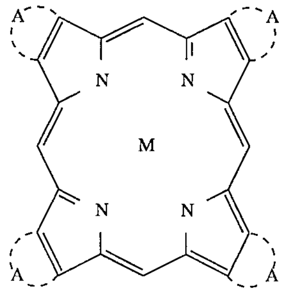

[II]

-continued

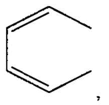

(a)

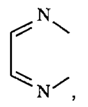

(b)

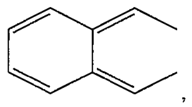

(c)

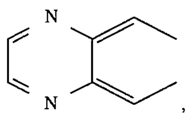

(d)

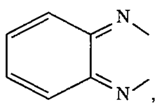

(e)

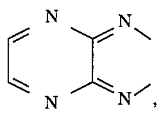

(f)

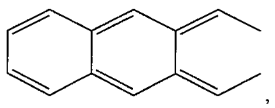

(g)

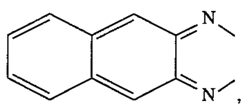

(h)

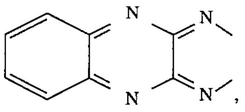

(i)

and

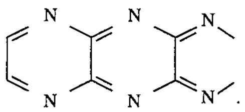

(j)

TABLE 1

| A | Tetraaza-porphyrin or porphyrin skeleton | Color | (λmax:nm) | Center Metal M | Alkali Metal for Doping |
|---|---|---|---|---|---|
| 2H | [I] | Reddish Purple | (590) | Fe | K |
| (a) | [I] | Blue | (670) | Fe | K |
| (b) | [I] | Greenish Blue | (650) | Fe | K |
| (c) | [I] | Green | (780) | Fe | K |
| (d) | [I] | Bluish Green | (750) | Fe | K |
| (e) | [I] | Bluish Green | (740) | Fe | K |
| (f) | [I] | Bluish Green | (735) | Fe | K |
| (g) | [I] | Red | (850) | Fe | K |
| (h) | [I] | Yellow | (830) | Fe | K |
| (i) | [I] | Yellow | (820) | Fe | K |
| (j) | [I] | Yellowish Green | (810) | Fe | K |

TABLE 1-continued

| A | Tetraaza-porphyrin or porphyrin skeleton | Color (λmax:nm) | | Center Metal M | Alkali Metal for Doping |
|---|---|---|---|---|---|
| 2H | [II] | Red | (550) | Fe | K |
| (a) | [II] | Reddish Brown | (620) | Fe | K |
| (b) | [II] | Reddish Purple | (605) | Fe | K |
| (c) | [II] | Bluish Green | (720) | Fe | K |
| (d) | [II] | Bluish Green | (710) | Fe | K |
| (e) | [II] | Greenish Blue | (705) | Fe | K |
| (f) | [II] | Greenish Blue | (700) | Fe | K |
| (g) | [II] | Yellow | (805) | Fe | K |
| (h) | [II] | Yellowish Green | (780) | Fe | K |
| (i) | [II] | Yellowish Green | (770) | Fe | K |
| (j) | [II] | Green | (765) | Fe | K |

In addition, conventional coloring agents for use in conventional toners can also be employed in combination with the magnetic composition in the magnetic toner of the present invention.

Specific examples of such coloring agents for use in the magnetic toner of the present invention include carbon black, lamp black, iron black, ultramarine, Nigrosine dye, Aniline Blue, Du Pont Oil Red, Quinoline Yellow, Methylene Blue Chloride Phthalocyanine Blue, Phthalocyanine Green, Rhodamine 6C Lake, Chrome Yellow, quinacridone, Benzidine Yellow, Malachite Green, Hansa Yellow G, Malachite Green hexalate, oil black, azo oil black, Rose Bengale, monoazo pigments, disazo pigments, trisazo pigments, tertiary ammonium salts, metallic salts of salicylic acid and salicylic acid derivatives, and mixtures thereof.

Preferable examples of a yellow coloring agent for use in a color magnetic toner of the present invention include Chrome Yellow, Benzidine Yellow, Hansa Yellow, Naphtol Yellow, and Quinoline Yellow; preferable examples of a magenta coloring agent therefor include Rhodamine 6G Lake, Watching Red, Rose Bengale, and Rhodamine B; and preferable examples of a cyan coloring agent therefor include Phthalocyanine Blue, Methylene Blue, Victoria Blue, Aniline Blue, and Ultramarine Blue.

In the magnetic toner of the present invention, even when it is a color toner, inorganic magnetic materials can also be employed in combination with the magnetic composition of the present invention.

Furthermore, the magnetic toner of the present invention may further contain a charge controlling agent for controlling the polarity of the toner; a fluidization agent such as colloidal silica; abradants, for example, metallic oxides such as aluminum oxide, and silicon carbide; and lubricants such as metal salts of fatty acids.

A magnetic ink of the present invention comprises a vehicle and the magnetic composition of the present invention, which comprises the above-mentioned alkali-metal-doped tetraazaporphyrin derivative or alkali-metal-doped porphyrin derivative and serves as a coloring agent in the same manner as mentioned previously in the magnetic toner, and a coloring agent, if necessary.

The magnetic ink of the present invention can be composed of organic components in its entirety because the magnetic composition for use in the magnetic ink can be composed of the above-mentioned alkali-metal-doped tetraazaporphyrin derivative or alkali-metal-doped porphyrin derivative, so that the compatibility of the magnetic composition with the vehicle is excellent, and the dispersibility of the magnetic composition in the vehicle is also excellent. As a result, the magnetic ink of the present invention is capable of printing clear color images with high image quality.

The magnetic ink of the present invention can be produced as an oil magnetic ink, a hot-melt type magnetic ink and an aqueous magnetic ink.

The oil magnetic ink of the present invention may comprise the magnetic composition of the present invention and a vehicle comprising an oil component, if necessary, a coloring agent, a resin component and a dispersion medium, and an additive.

Specific examples of the coloring agent are Fast Yellow G, Hansa Brilliant Yellow 5GX, Disazo Yellow AAA, Naphthol Red HFG, Lake Red C, Benzimidazolone Carmine HF3C, Dioxazine Violet, Phthalocyanine Blue, Phthalocyanine Green, Benzimidazolone Brown HFR, carbon black, Aniline Black, titanium oxide, Tartrazine Lake, Rhodamine 6G Lake, Methyl Violet Lake, Basic 6G Lake, Brilliant Green lakes, and Nigrosine.

The coloring agents for use in the previously mentioned magnetic toner can also be employed.

Specific examples of the oil component of the vehicle for the magnetic ink include linseed oil, soybean oil, castor oil, dehydrated castor oil, litho varnish, maleoyl, vinylated oil, urethanated oil, machine oil, and spindle oil.

Specific examples of the resin component include rosin, shellac, copal, dammar, gilsonite, zein, limed rosin, ester gum, phenolic resin, xylene resin, urea resin, melamine resin, ketone resin, coumarone-indene resin, petroleum resin, terpene resin, cyclized rubber, rubber chloride, alkyd resin, polyamide resin, acrylic resin, polyvinyl chloride, vinyl chloride - vinyl acetate copolymer resin, polyvinyl acetate, polyvinyl alcohol, polyvinyl butyral, chlorinated polypropylene, polystyrene, epoxy resin, polyurethane and cellulose derivatives.

Specific examples of the dispersion medium include n-hexane, n-heptane, toluene, xylene, methyl alcohol, isopropyl alcohol, ethylene glycol, triethylene glycol, diethylene glycol, glycerol, methyl cellosolve, carbitol, ethyl acetate, acetone and methyl ethyl ketone.

Examples of the additive are wax, a dryer, a dispersant, a humectant, a cross-linking agent, a stabilizer, a thickening agent, a gelatinizing agent, a defoaming agent and an initiator for photopolymerization.

The hot-melt magnetic ink of the present invention may comprise the magnetic composition of the present invention and a hot-melt vehicle, and if necessary, a coloring agent and an additive.

Specific examples of the hot-melt vehicle for use in the hot-melt magnetic ink include carnauba wax, bees wax, anhydrous lanolin, paraffin wax, montan wax, ozocerite, ceresine, vaseline, polyethylene wax, chlorinated fatty acid amide, phenyl salicylate, triphenyl phosphate, n-heptyl p-hydroxybenzoate, and dicyclohexyl phthalate.

Examples of the coloring agent and additive for use in the hot-melt magnetic ink may be respectively the same as those for the oil magnetic ink.

The aqueous magnetic ink of the present invention may comprise the magnetic composition of the present invention, a vehicle comprising a resin component, a water-solubility-imparting agent, an auxiliary agent and water, and if necessary, a coloring agent and an additive.

Specific examples of the resin component for use in the aqueous magnetic ink include starch, dextrin, alginate, cellulose ester, polyvinyl alcohol, polyacrylamide, polyethylene oxide, shellac, styrenated shellac, rosin maleic acid resin, casein, acrylic copolymer, vinyl acetate resin, polyvinylchloride resin, synthetic rubber latex, polyurethane, polyester, alkyd resin, rosin ester and epoxy ester.

Specific examples of the water-solubility-imparting agent include ammonia water, monoethanolamine, monoisopropanolamine, ethylmonoethanolamine, diethyl-ethanolamine, dimethylethanolamine and morpholine.

Specific examples of the auxiliary agent include ethyl alcohol, isopropyl alcohol, ethyl acetate and methyl ethyl ketone.

Specific examples of the coloring agent for use in the aqueous magnetic ink may be the same as those for the oil magnetic ink.

Specific examples of the additive include resistance-to-wear improving agents such as petroleum wax and polyethylene wax; a nonionic surface active agent; defoaming agents such as silicone and alcohols.

The thus obtained magnetic ink of the present invention can be used for an ink jet printer, a thermal transfer printer, a hot-melt printer and ordinary instrument for writing.

Furthermore, magnetic signals can be applied to and stored in the magnetic composition contained in the magnetic ink, so that printed images can be read by a magnetic head. Therefore, the magnetic ink of the present invention can be used for printing images in magnetic cards for use as certificates and tickets, and in bank notes, and for the addition of confidential information to documents or preservation of confidential information therein.

By use of the magnetic ink of the present invention, it is possible to perform color printing, and the magnetic composition employed in the magnetic ink has so good a compatibility with the resin component employed in the magnetic ink that the dispersibility of the magnetic composition in the resin component is good and no cracks are formed in the images printed by the magnetic ink of the present invention.

Other features of this invention will become apparent in the course of the following description of exemplary embodiments, which are given for illustration of the invention and are not intended to be limiting thereof.

EXAMPLE 1

One part by weight of a purified iron (II) phthalocyanine was doped with 4 parts by weight of metal potassium for 1 hour, with a predetermined sufficient degree of vacuum being maintained in a doping system as illustrated in FIG. 1, whereby a potassium-doped iron phthalocyanine (hereinafter referred to as K-FePc) which can be employed as an organic magnetic composition was obtained.

Figure 2:
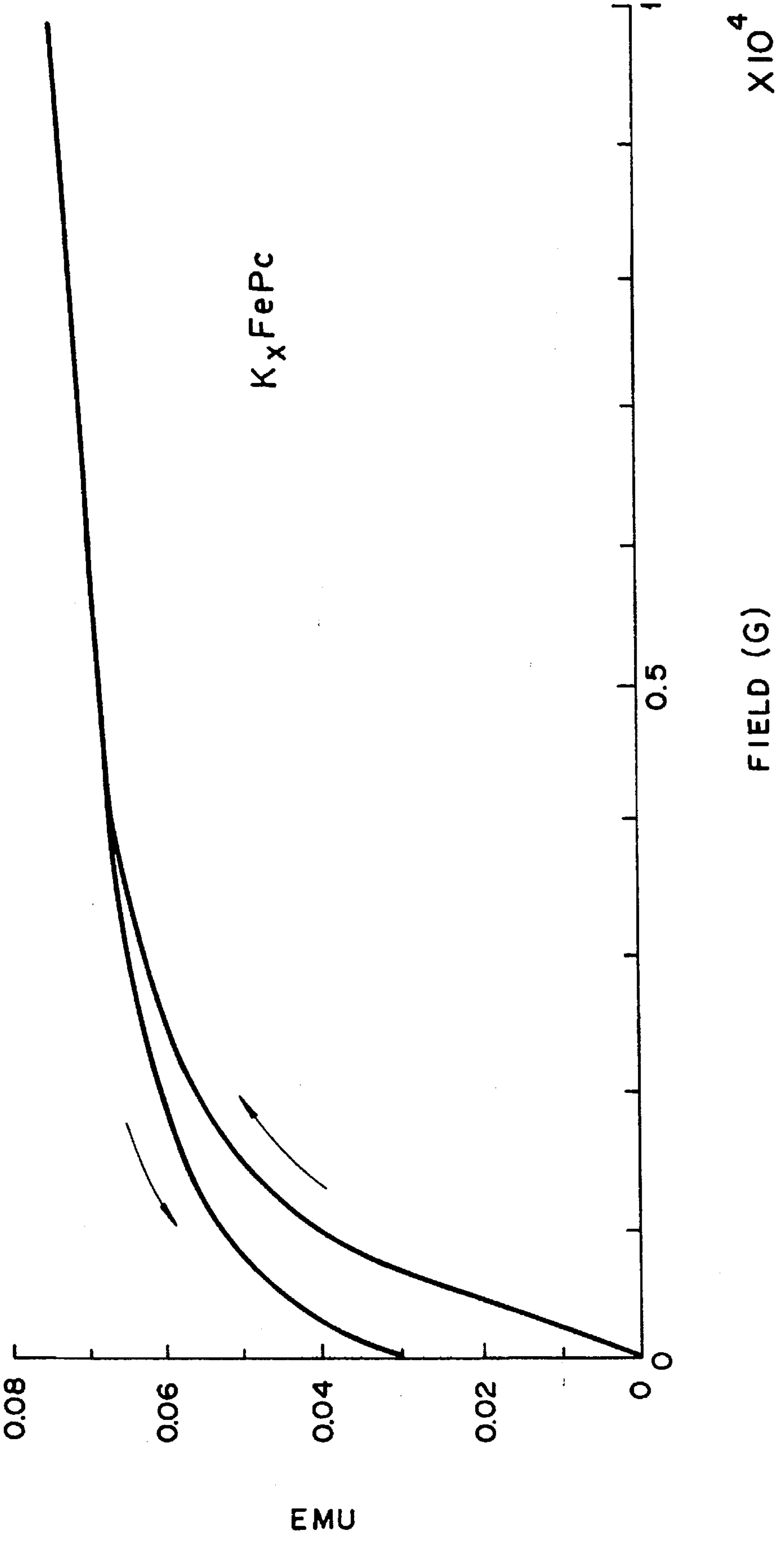
FIG. 2 shows a graph showing the magnetic field dependency of the magnetization of an organic magnetic composition comprising a potassium-doped iron (II) phthalocyanine (hereinafter referred to as K-FePc) prepared in Example 1 under 5 K, with the magnetization (EMU) thereof as ordinate and the intensity of the magnetic field (Gauss) as abscissa.
Figure 3:
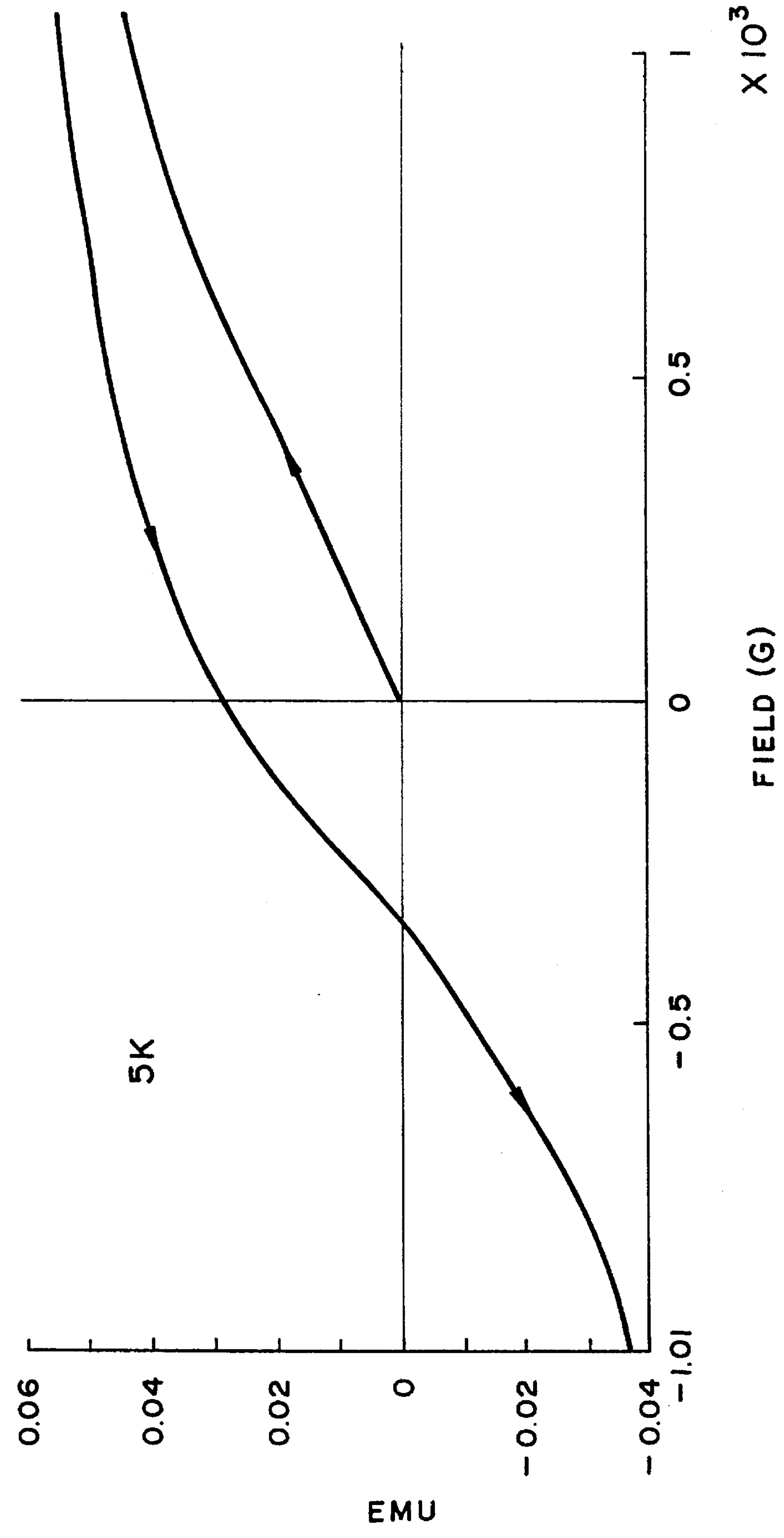
FIG. 3 shows the same graph as shown in FIG. 2, provided that the illustration of the magnetic field dependency of the magnetization of the K-FePc is enlarged in an area near the zero point of the magnetic field.

FIGS. 2 and 3 show the magnetic field dependency of the magnetization of the K-FePc under 5 K, with the magnetization (EMU) thereof as ordinate and the intensity of the magnetic field (Gauss) as abscissa.

To be more specific, as shown in FIG. 2, when the intensity of the magnetic field applied to the thus obtained potassium-doped iron phthalocyanine was increased, the magnetization thereof proceeded along the lower initial magnetization curve, while when the intensity of the magnetic field applied thereto was decreased, the magnetization was decreased along the upper magnetization curve, but did not reach a zero magnetization.

FIG. 3 shows the same graph as shown in FIG. 2, provided that the illustration of the magnetic field dependency of the magnetization of the K-FePc is enlarged in an area near the zero point of the magnetic field.

The K-FePc exhibited a ferromagnetic behavior at room temperature and a saturation magnetization of about 10 emu/g.

EXAMPLE 2

One part by weight of a purified cobalt (II) phthalocyanine was doped with 4 parts by weight of metal potassium for 1 hour in the same doping system as employed in Example 1, whereby a potassium-doped cobalt phthalocyanine (hereinafter referred to as K-CoPc) was obtained.

Figure 4:
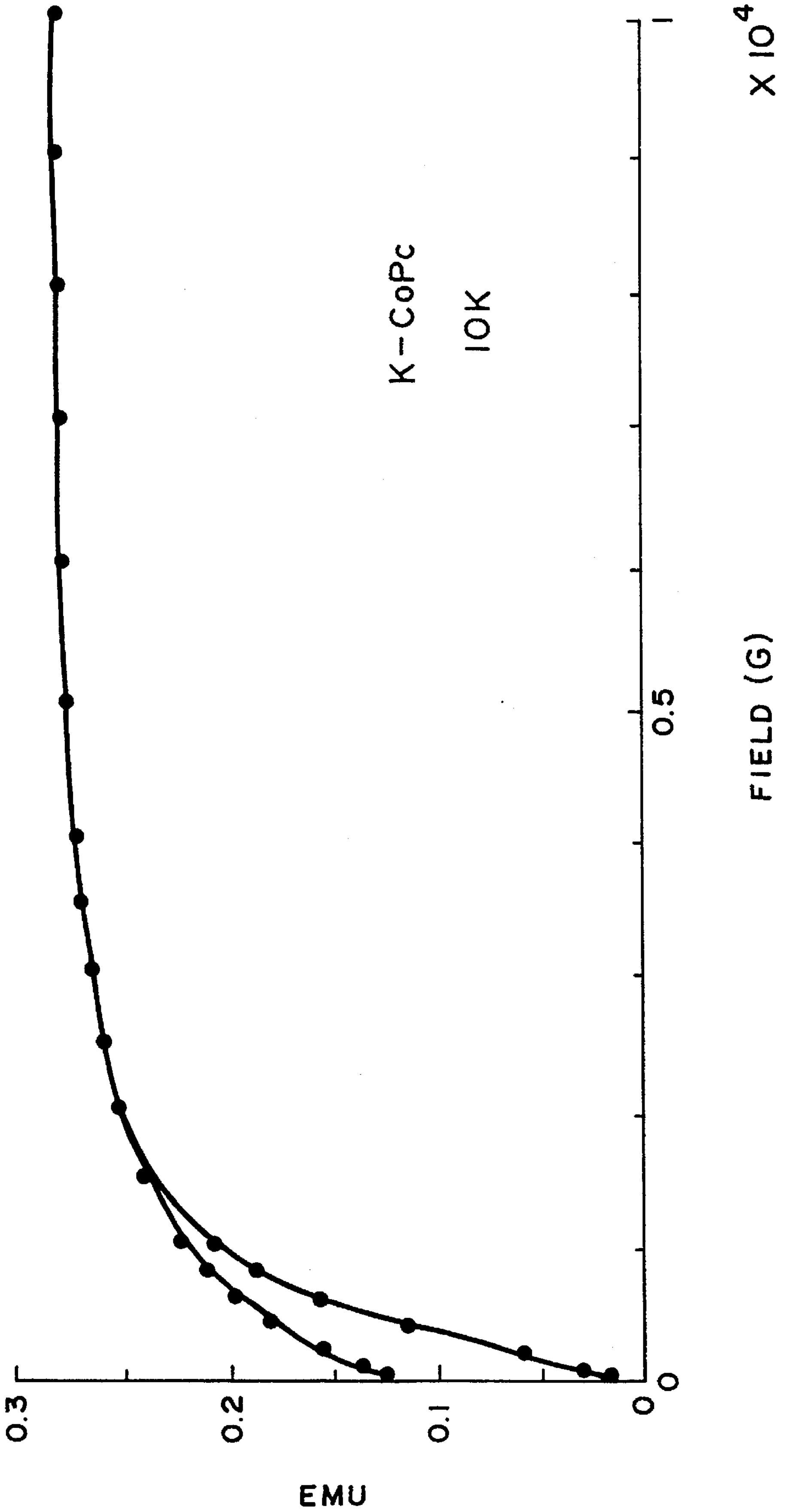
FIGS. 4 and 5 show the magnetic field dependency of the magnetization of an organic magnetic composition comprising a potassium-doped cobalt (II) phthalocyanine (hereinafter referred to as the K-CoPc) prepared in Example 2 under 10 K.
Figure 5:
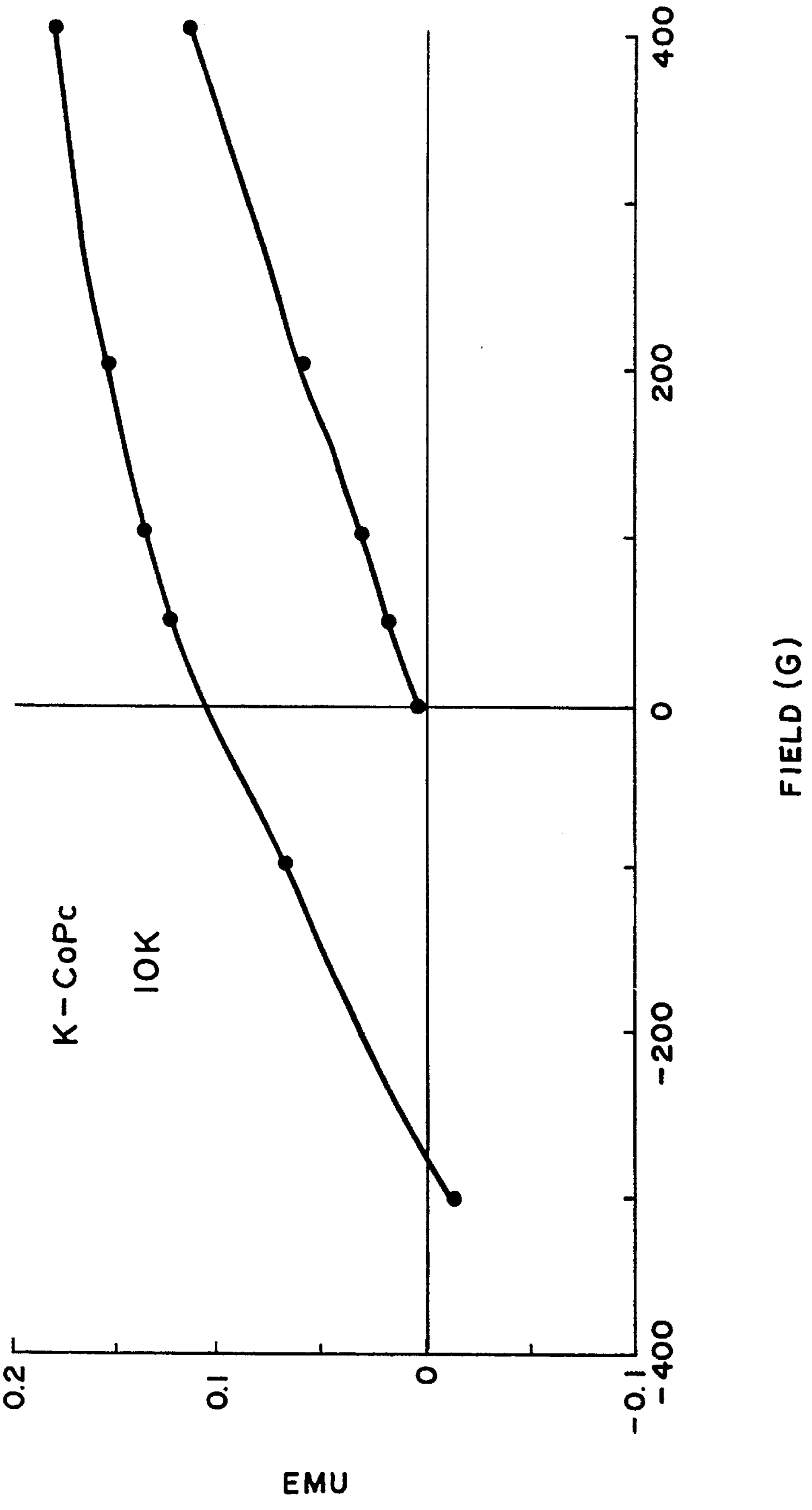

FIGS. 4 and 5 show the magnetic field dependency of the magnetization of the K-CoPc under 10 K, with the magnetization (EMU) thereof as ordinate and the intensity of the magnetic field (Gauss) as abscissa.

In FIG. 4, the curve which starts from the zero point of the magnetization is an initial magnetization curve of the K-CoPc, and the curve which does not start from the zero point of the magnetization is a magnetization curve of the K-CoPc.

FIG. 5 shows the same graph as shown in FIG. 4, provided that the illustration of the magnetic field dependency of the magnetization of the K-CoPc is enlarged in an area near the zero point of the magnetic field.

Figure 6:
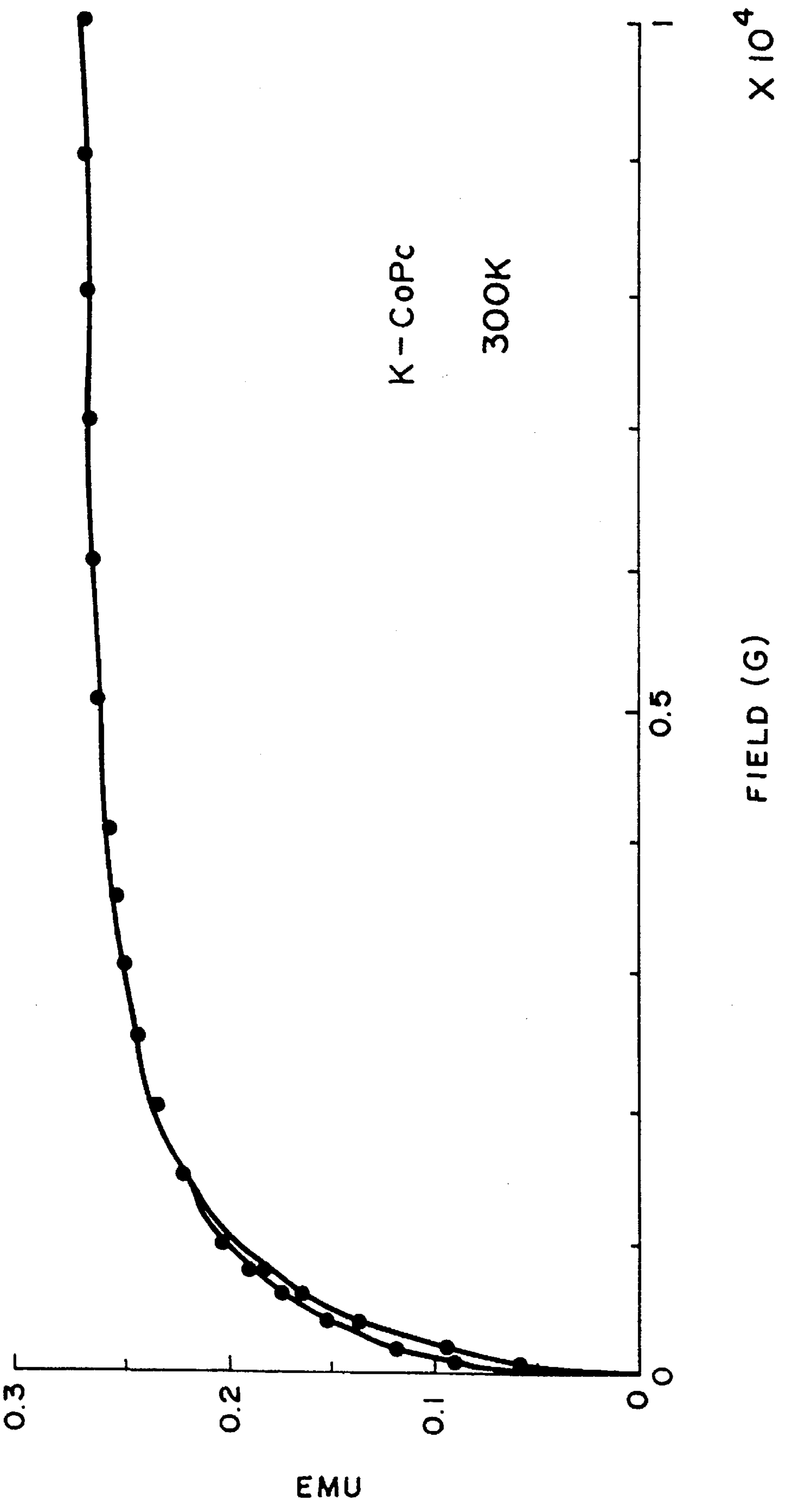
FIGS. 6 and 7 show the magnetic field dependency of the magnetization of the organic magnetic composition comprising the K-CoPc prepared in Example 2 under 300 K.
Figure 7:
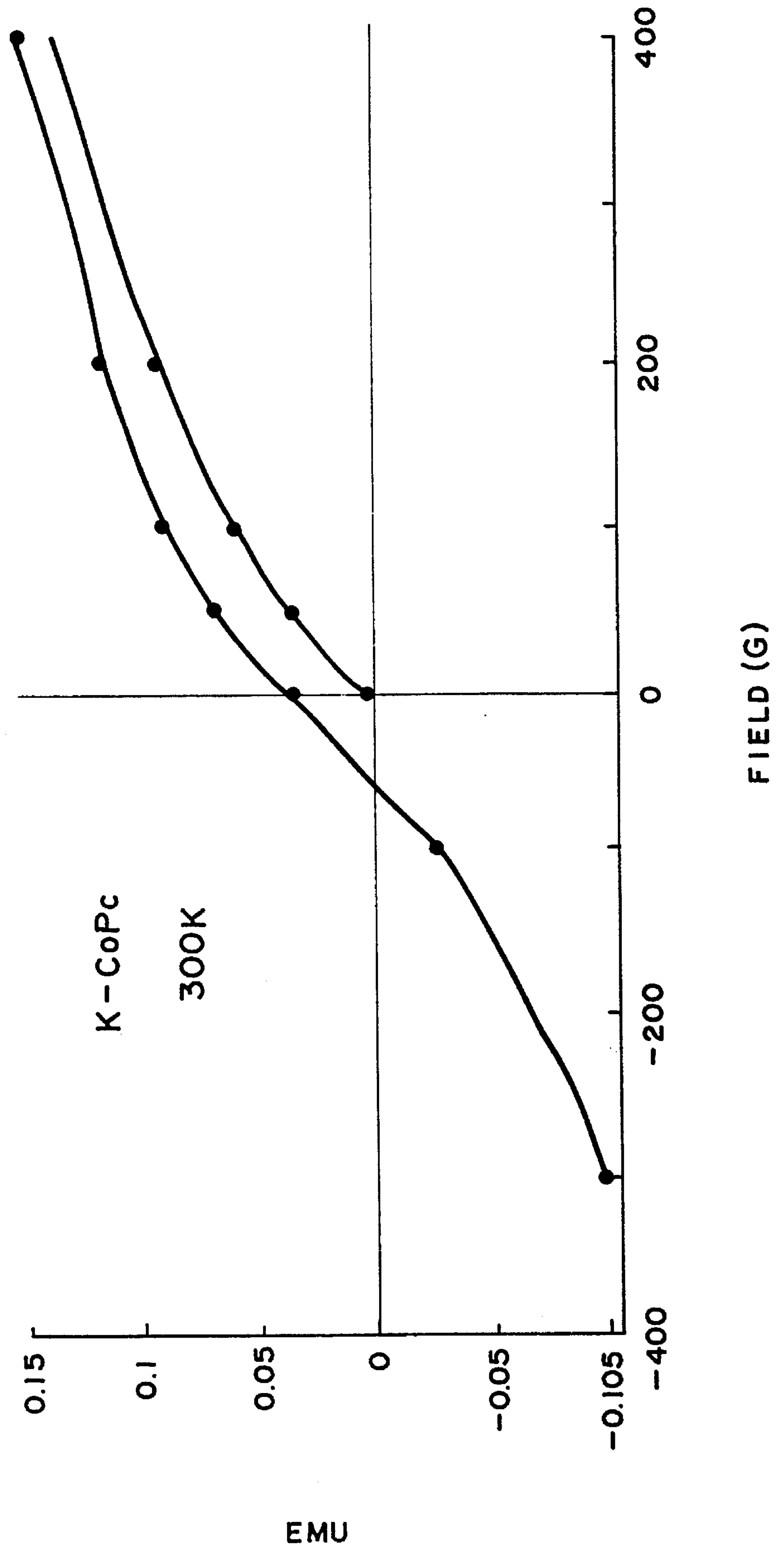

FIGS. 6 and 7 show the magnetic field dependency of the magnetization of the K-CoPc under 300 K, with the magnetization (EMU) thereof as ordinate and the intensity of the magnetic field (Gauss) as abscissa.

In FIG. 6, the curve which starts from the zero point of the magnetization is an initial magnetization curve of the K-CoPc, and the curve which does not start from the zero point of the magnetization is a magnetization curve of the K-CoPc.

FIG. 7 shows the same graph as shown in FIG. 6, provided that the illustration of the magnetic field dependency of the magnetization of the K-CoPc is enlarged in an area near the zero point of the magnetic field.

The K-CoPc exhibited a saturation magnetization of about 9 emu/g.

EXAMPLE 3

One part by weight of a purified nickel (II) phthalocyanine was doped with 4 parts by weight of metal potassium for 1 hour in the same doping system as employed in Example 1, whereby a potassium-doped nickel phthalocyanine (hereinafter referred to as K-NiPc) was obtained.

The thus obtained K-NiPc exhibited a saturation magnetization of about 7 emu/g.

EXAMPLE 4

A kneaded mixture of a purified iron (II) phthalocyanine and a purified copper (II) phthalocyanine with a mixing ratio by weight of 1:1 was subjected to vacuum sublimation, whereby a purified composite of iron phthalocyanine and copper phthalocyanine was obtained.

One part by weight of the thus obtained purified composite of iron phthalocyanine and copper phthalocyanine was doped with 4 parts by weight of metal potassium for 1 hour in the same doping system as employed in Example 1, whereby a potassium-doped iron-copper phthalocyanine (hereinafter referred to as K-FeCuPc) was obtained.

Figure 8:
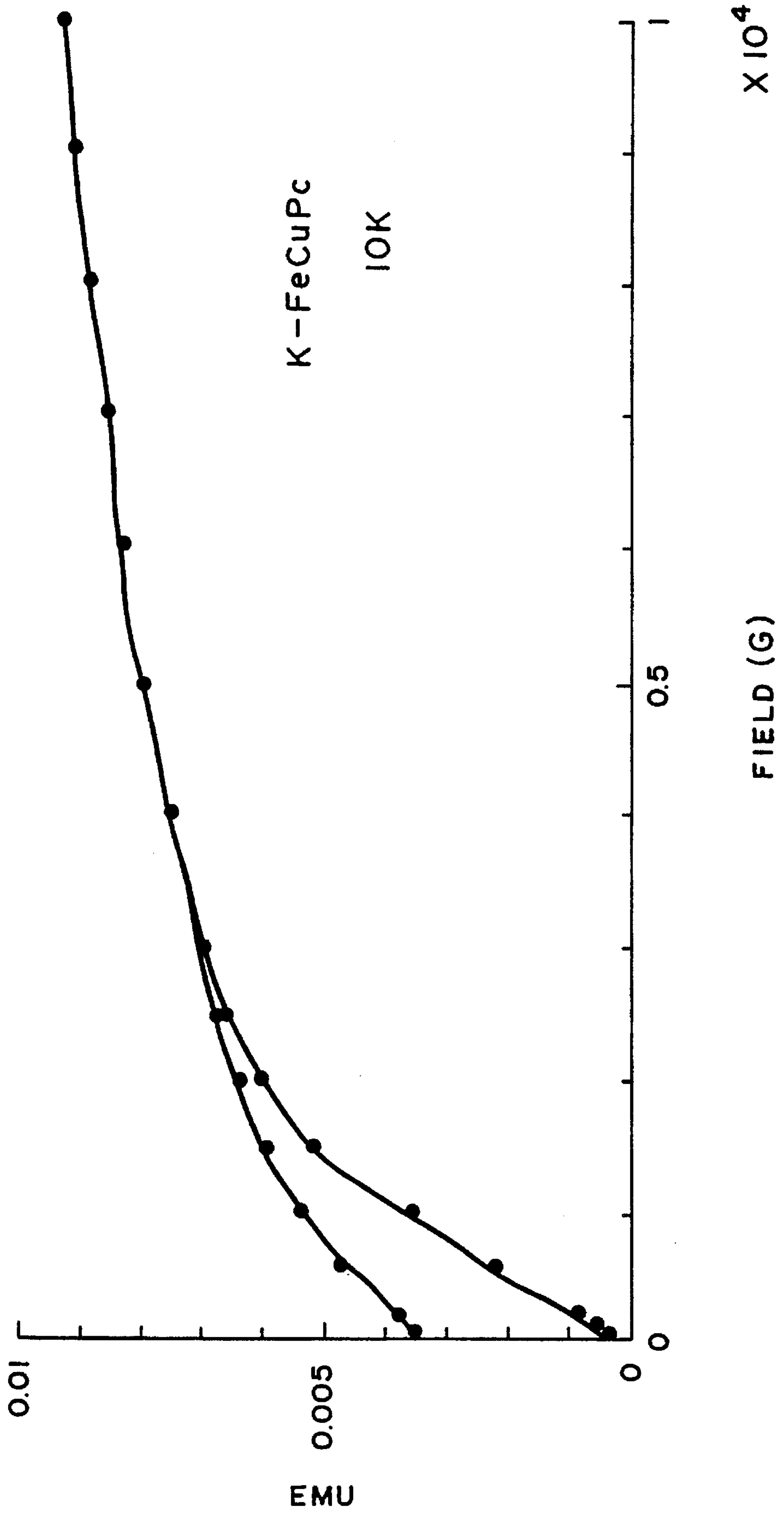
FIGS. 8 and 9 show the magnetic field dependency of the magnetization of an organic magnetic composition comprising a potassium-doped iron copper phthalocyanine (hereinafter referred to as the K-FeCuPc) prepared in Example 4 under 10 K.
Figure 9:
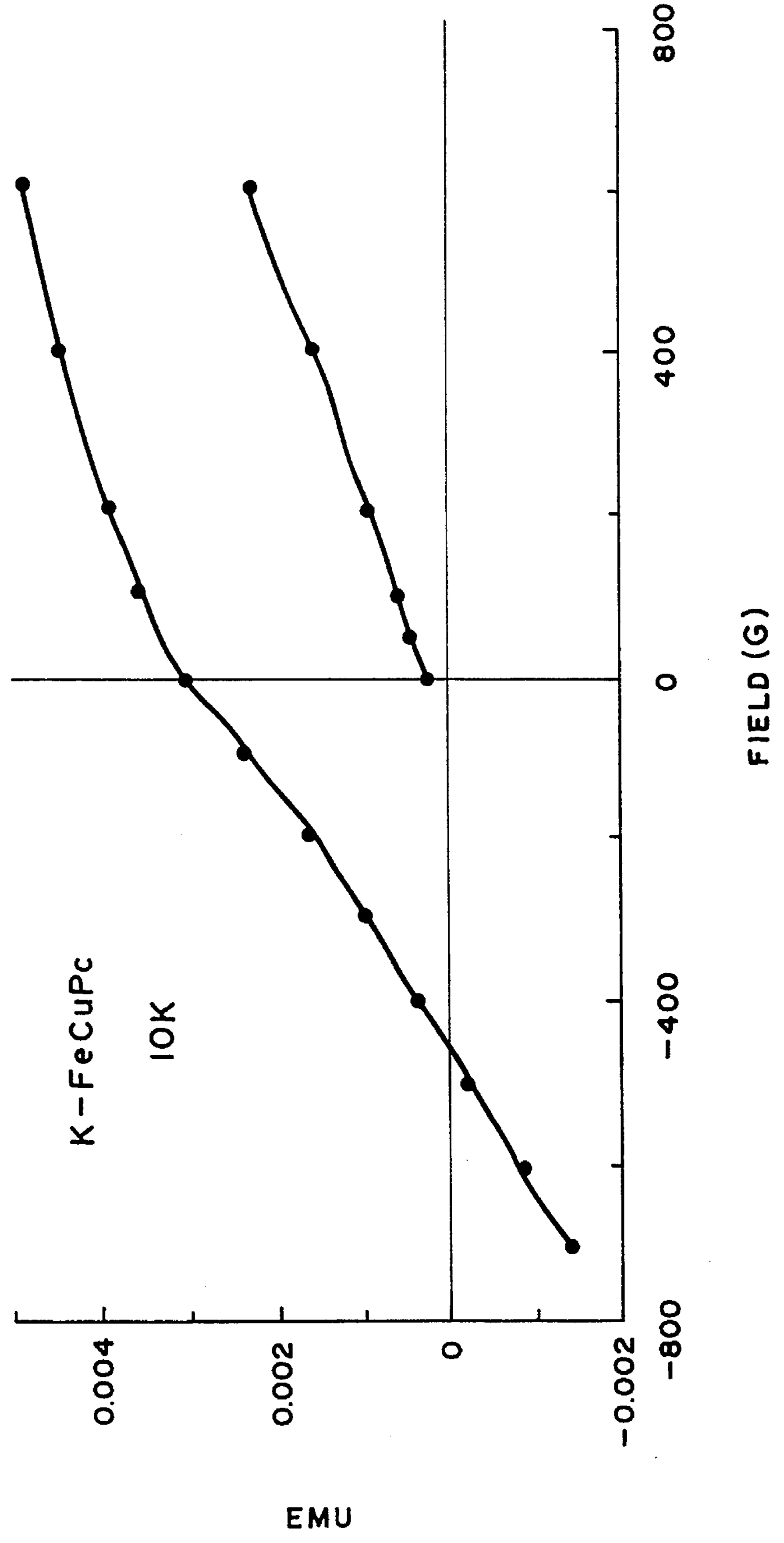

FIGS. 8 and 9 show the magnetic field dependency of the magnetization of the K-FeCuPc under 10 K, with the magnetization (EMU) thereof as ordinate and the intensity of the magnetic field (Gauss) as abscissa.

In FIG. 8, the curve which starts from the zero point of the magnetization is an initial magnetization curve of the K-FeCuPc, and the curve which does not start from the zero point of the magnetization is a magnetization curve of the K-FeCuPc.

FIG. 9 shows the same graph as shown in FIG. 8, provided that the illustration of the magnetic field dependency of the magnetization of the K-FeCuPc is enlarged in an area near the zero point of the magnetic field.

Figure 10:
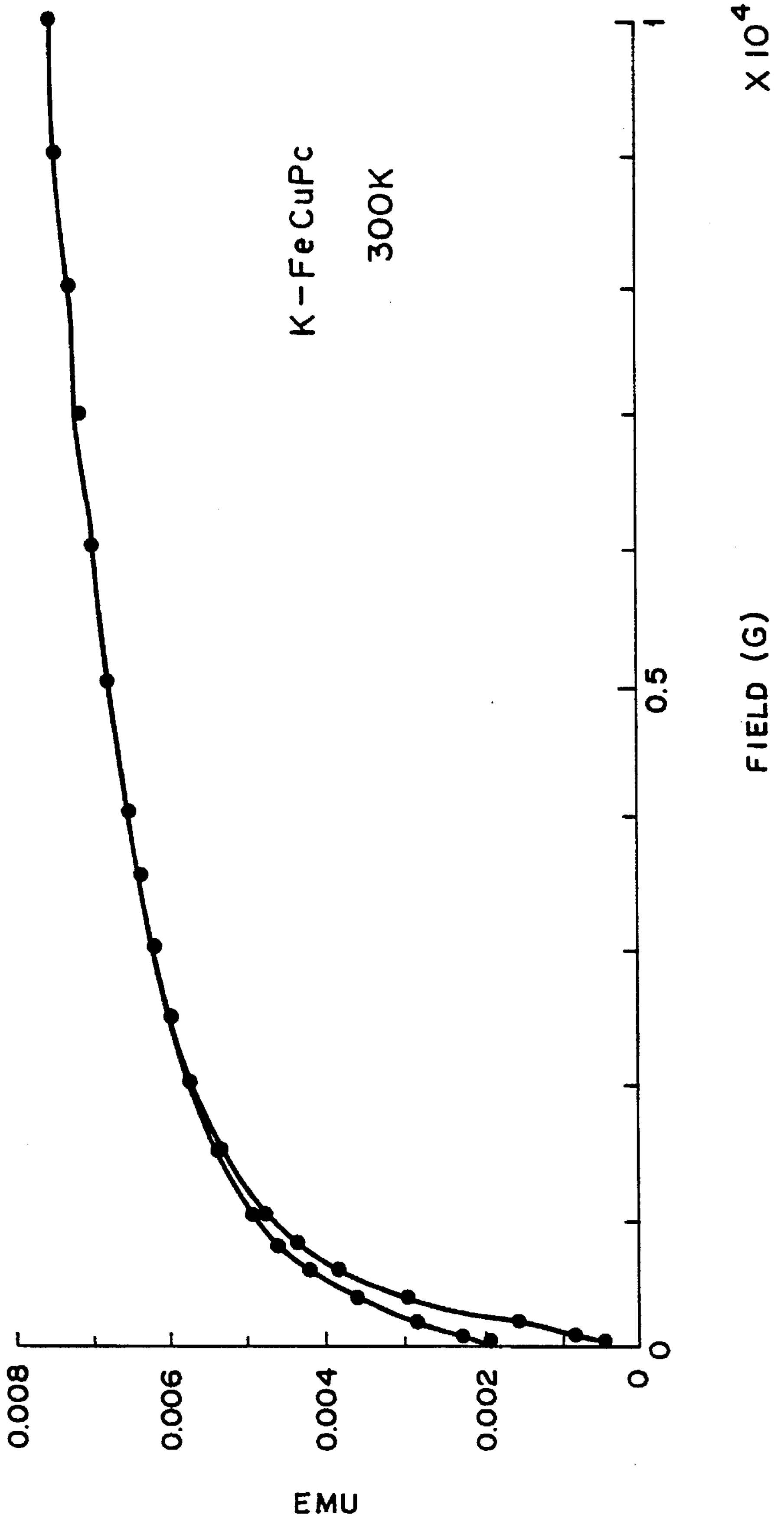
FIGS. 10 and 11 show the magnetic field dependency of the magnetization of the organic magnetic composition comprising the K-FeCuPc prepared in Example 4 under 300 K.
Figure 11:
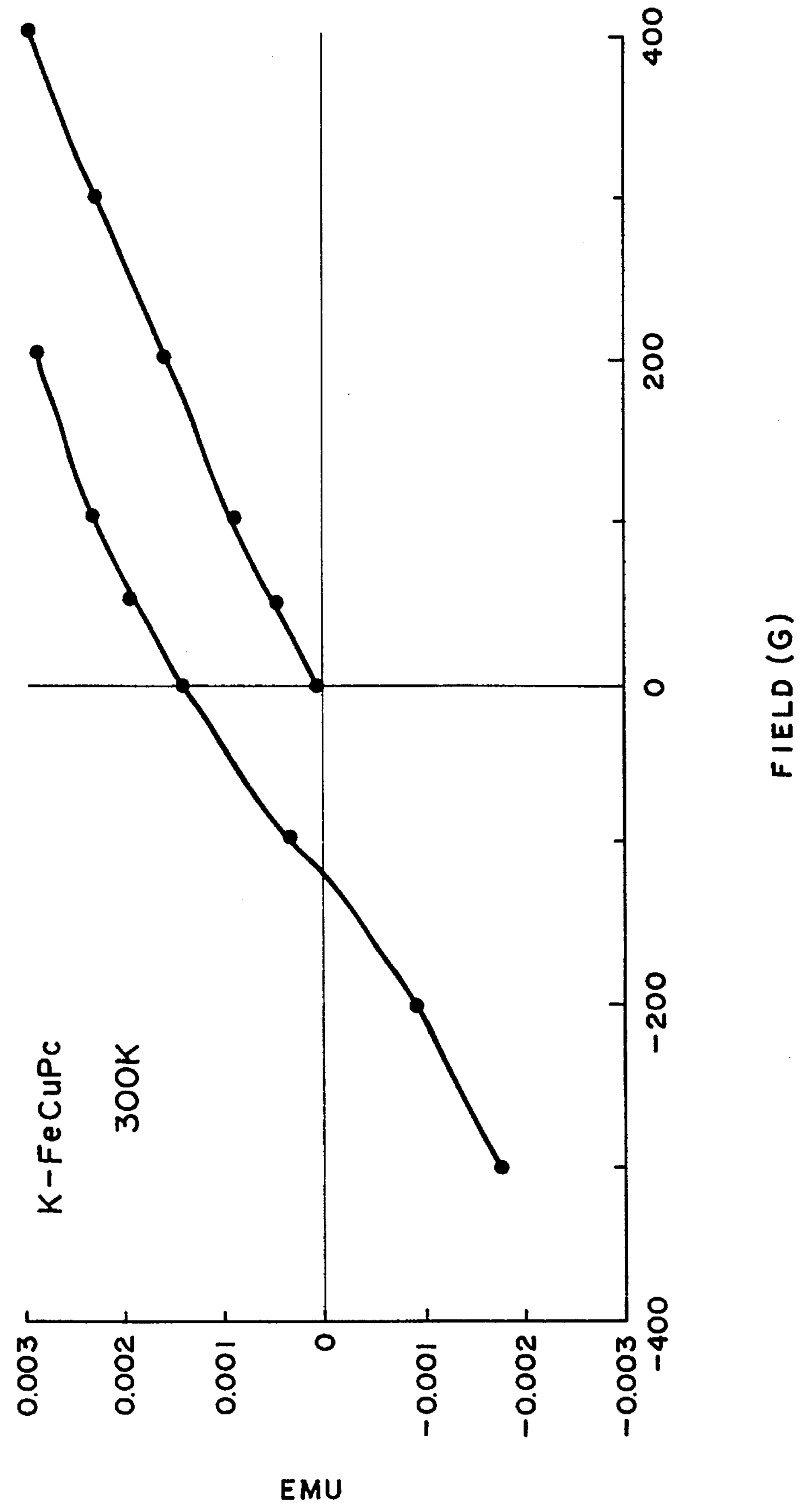

FIGS. 10 and 11 show the magnetic field dependency of the magnetization of the K-FeCuPc under 300 K, with the magnetization (EMU) thereof as ordinate and the intensity of the magnetic field (Gauss) as abscissa.

In FIG. 10, the curve which starts from the zero point of the magnetization is an initial magnetization curve of the K-FeCuPc, and the curve which does not start from the zero point of the magnetization is a magnetization curve of the K-FeCuPc.

FIG. 11 shows the same graph as shown in FIG. 10, provided that the illustration of the magnetic field dependency of the magnetization of the K-FeCuPc is enlarged in an area near the zero point of the magnetic field.

The thus obtained K-FeCuPc exhibited a saturation magnetization of about 4 to 5 emu/g.

EXAMPLE 5

A kneaded mixture of a purified iron (II) phthalocyanine and a purified lead (II) phthalocyanine with a mixing ratio by weight of 1:1 was subjected to vacuum sublimation, whereby a purified composite of iron phthalocyanine and lead phthalocyanine was obtained.

One part by weight of the thus obtained purified composite of iron phthalocyanine and lead phthalocyanine was doped with 4 parts by weight of metal potassium for 1 hour in the same doping system as employed in Example 1, whereby a potassium-doped iron-lead phthalocyanine (hereinafter referred to as K-FePbPc) was obtained.

Figure 12:
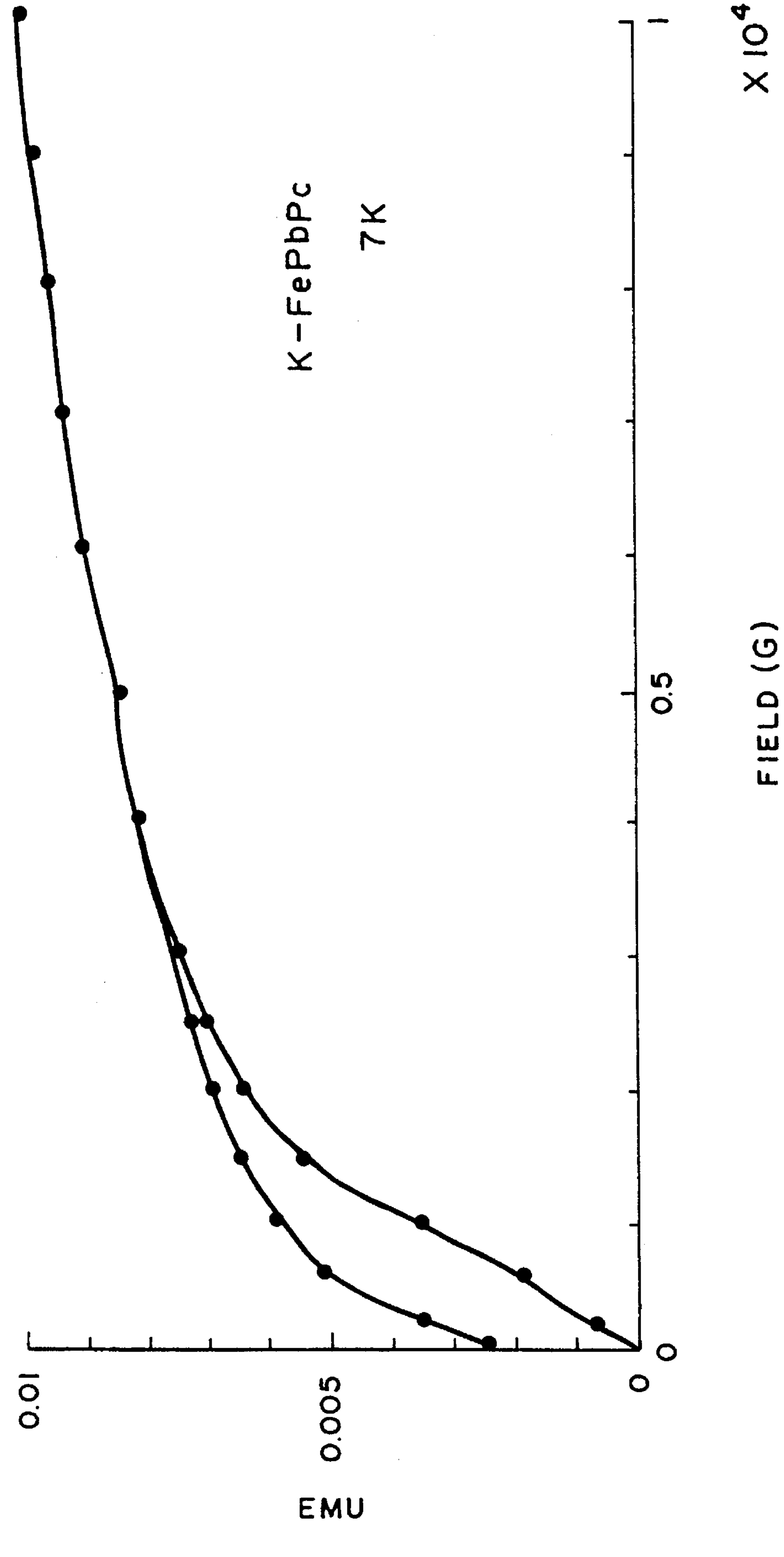
FIGS. 12 and 13 show the magnetic field dependency of the magnetization of an organic magnetic composition comprising a potassium-doped iron lead phthalocyanine (hereinafter referred to as the K-FePbPc) prepared in Example 5 under 7 K.
Figure 13:
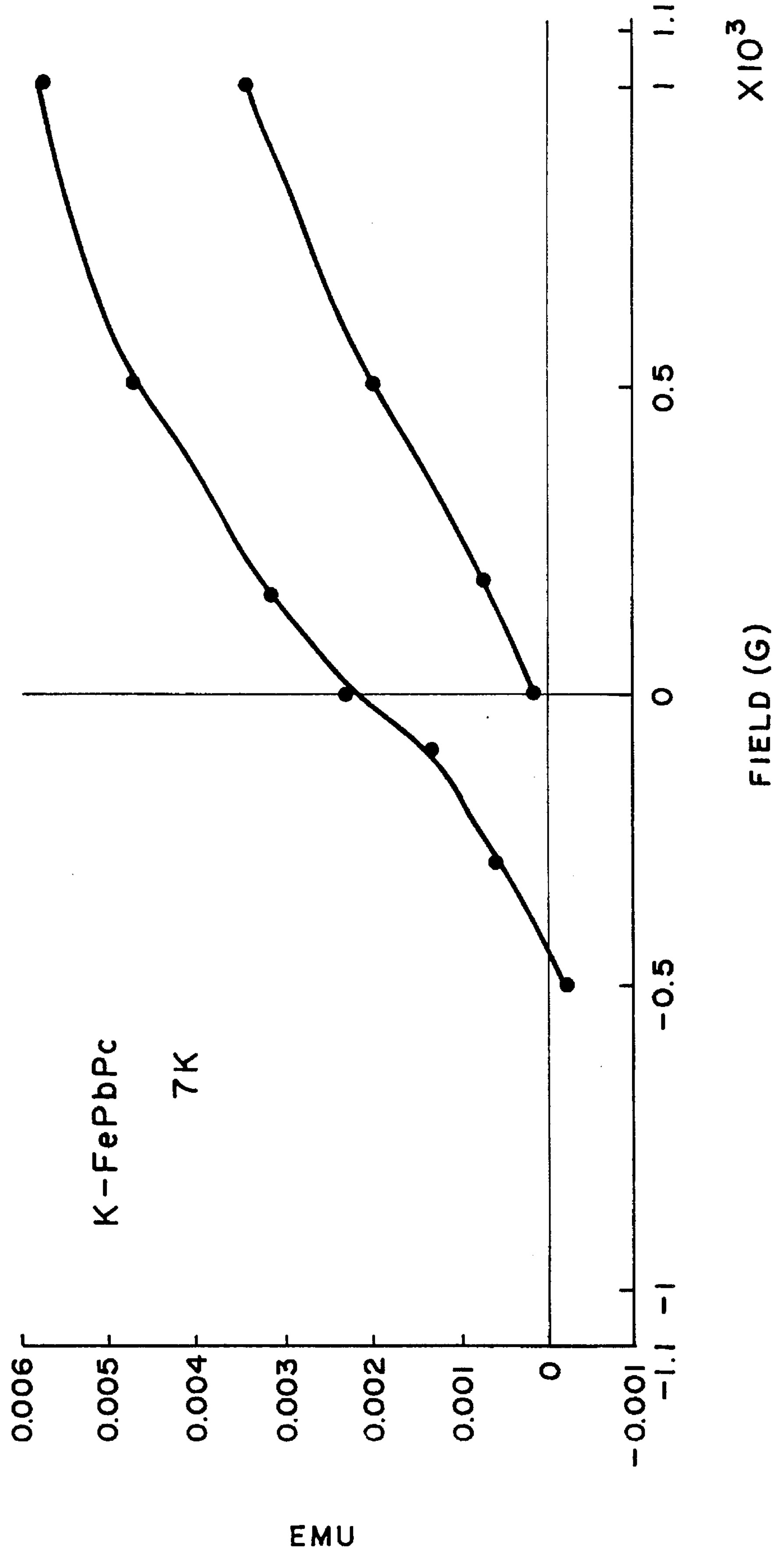

FIGS. 12 and 13 show the magnetic field dependency of the magnetization of the K-FePbPc under 7 K, with the magnetization (EMU) thereof as ordinate and the intensity of the magnetic field (Gauss) as abscissa.

In FIG. 12, the curve which starts from the zero point of the magnetization is an initial magnetization curve of the K-FePbPc, and the curve which does not start from the zero point of the magnetization is a magnetization curve of the K-FePbPc.

FIG. 13 shows the same graph as shown in FIG. 12, provided that the illustration of the magnetic field dependency of the magnetization of the K-FePbPc is enlarged in an area near the zero point of the magnetic field.

Figure 14:
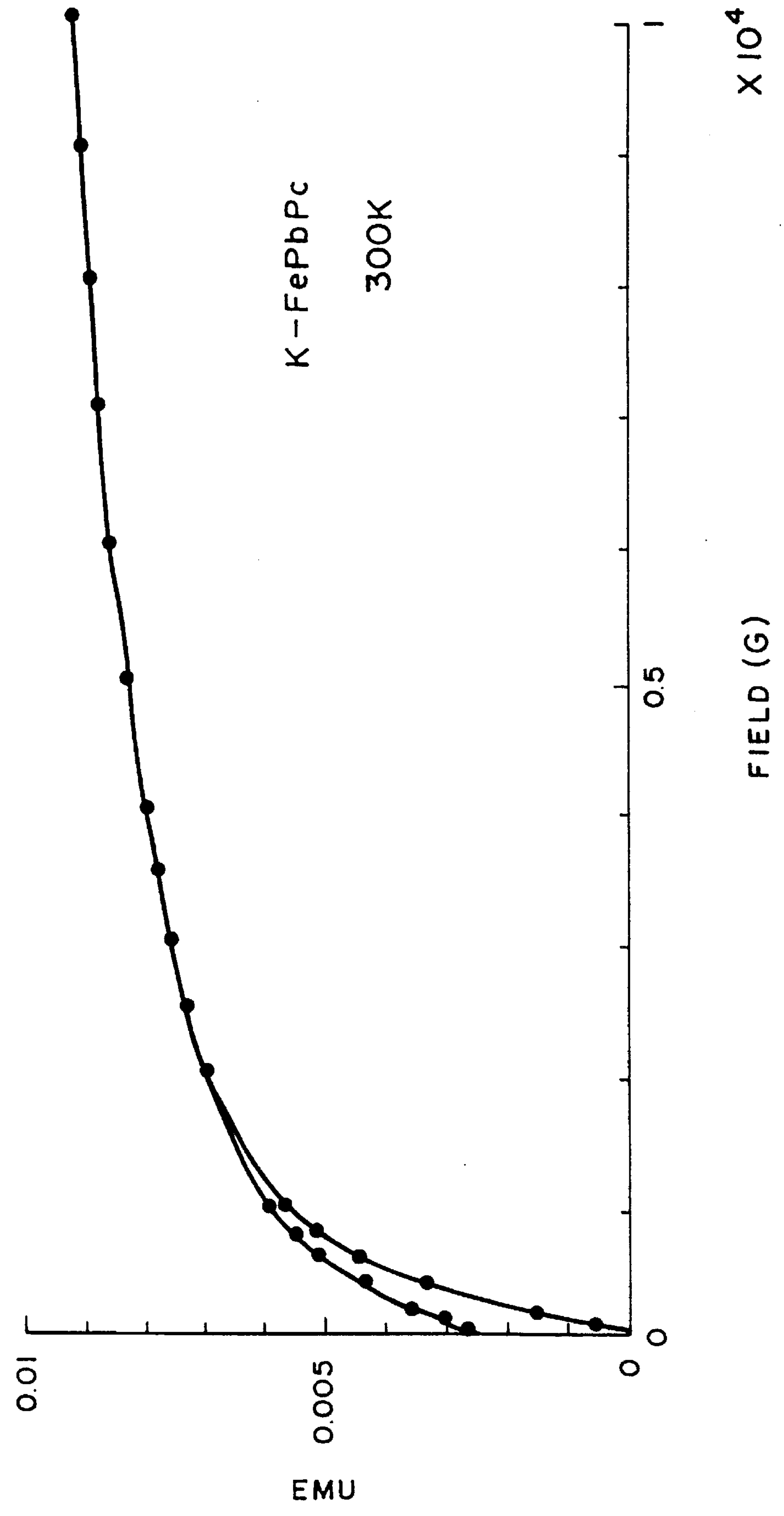
FIGS. 14 and 15 show the magnetic field dependency of the magnetization of the organic magnetic composition comprising the K-FePbPc prepared in Example 5 under 300 K.
Figure 15:
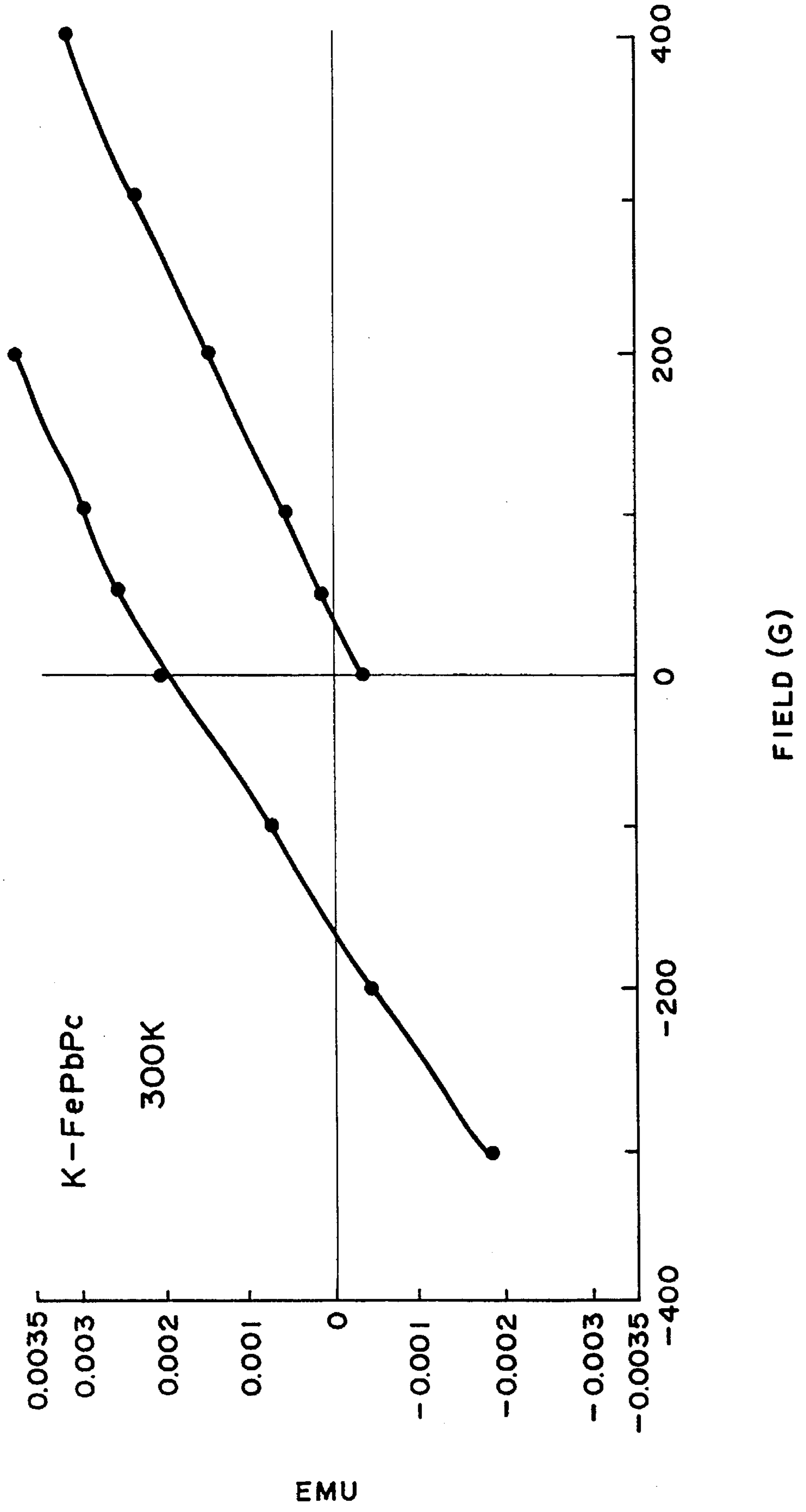

FIGS. 14 and 15 show the magnetic field dependency of the magnetization of the K-FePbPc under 300 K, with the magnetization (EMU) thereof as ordinate and the intensity of the magnetic field (Gauss) as abscissa.

In FIG. 14, the curve which starts from the zero point of the magnetization is an initial magnetization curve of the K-FePbPc, and the curve which does not start from the zero point of the magnetization is a magnetization curve of the K-FePbPc.

FIG. 15 shows the same graph as shown in FIG. 14, provided that the illustration of the magnetic field dependency of the magnetization of the K-FePbPc is enlarged in an area near the zero point of the magnetic field.

The thus obtained K-FePbPc exhibited a saturation magnetization of about 4 to 5 emu/g.

EXAMPLE 6

A kneaded mixture of a purified iron (II) phthalocyanine and a purified nickel (II) phthalocyanine with a mixing ratio by weight of 1:1 was subjected to vacuum sublimation, whereby a purified composite of iron phthalocyanine and nickel phthalocyanine was obtained.

One part by weight of the thus obtained purified composite of iron phthalocyanine and nickel phthalocyanine was doped with 4 parts by weight of metal potassium for 1 hour in the same doping system as employed in Example 1, whereby a potassium-doped iron-nickel phthalocyanine (hereinafter referred to as K-FeNiPc) was obtained.

EXAMPLE 7

A kneaded mixture of a purified cobalt (II) phthalocyanine and a purified platinum (II) phthalocyanine with a mixing ratio by weight of 1:1 was subjected to vacuum sublimation, whereby a purified composite of cobalt phthalocyanine and platinum phthalocyanine was obtained.

One part by weight of the thus obtained purified composite of cobalt phthalocyanine and platinum phthalocyanine was doped with 4 parts by weight of metal potassium for 1 hour in the same doping system as employed in Example 1, whereby a potassium-doped cobalt-platinum phthalocyanine (hereinafter referred to as K-CoPtPc) was obtained.

EXAMPLE 8

A mixture of the following components was sufficiently stirred and mixed in a Henschel mixer:

| | Parts by Weight |
|---|---|
| Styrene/n-butyl methacrylate copolymer | 100 |
| Quaternary ammonium salt (charge controlling agent) | 2 |
| K—FePc obtained in Example 1 (organic magnetic composition) | 50 |
| Carbon black | 5 |

The above mixture was heated to 130° to 140° C. for 30 minutes, fused and kneaded in a roll mill, and was then cooled to room temperature. The thus kneaded mixture was then pulverized and classified, whereby a magnetic toner with a particle size of 5 to 10 μm and a density of 1.2 $g/cm^3$ was obtained.

The thus obtained magnetic toner was then incorporated in a commercially available copying machine (Trademark "My Ricopy M-10", made by Ricoh Company, Ltd.), and copies were made. As a result, clear images were obtained.

This magnetic toner was also incorporated in a copying machine which was modified so as to attain a copy speed of 50 sheets per minute, and copies were made. As a result, clear images were obtained, and no scattering of the toner took place during the copy making process.

EXAMPLE 9

A mixture of the following components was sufficiently stirred and mixed in a Henschel mixer:

| | Parts by Weight |
|---|---|
| Styrene/n-butyl methacrylate copolymer | 100<br>100 |
| Quaternary ammonium salt (charge controlling agent) | 2 |
| K—FePc obtained in Example 1 (organic magnetic composition) | 100 |

-continued

| | Parts by Weight |
|---|---|
| Magnetite (inorganic magnetic material) | 10 |
| Carbon black | 5 |

The above mixture was heated to 130° to 140° C. for 30 minutes, fused and kneaded in a roll mill, and was then cooled to room temperature. The thus kneaded mixture was then pulverized and classified, whereby a magnetic toner with a particle size of 5 to 10 μm and a density of 1.4 $g/cm^3$ was obtained.

By use of the thus obtained magnetic toner in the same commercially available copying machine (Trademark "My Ricopy M-10", made by Ricoh Company, Ltd.) as employed in Example 8, copies were made. As a result, clear images were obtained.

This magnetic toner was also incorporated in the same copying machine as employed in Example 8, which was modified so as to attain a copy speed of 50 sheets per minute and copies were made. As a result, clear images were obtained, and no scattering of the toner took place during the copy making process.

COMPARATIVE EXAMPLE

A mixture of the following components was sufficiently stirred and mixed in a Henschel mixer:

| | Parts by Weight |
|---|---|
| Styrene/n-butyl methacrylate copolymer | 100 |
| Quaternary ammonium salt (charge controlling agent) | 2 |
| Yttrium iron garnet (inorganic magnetic material) | 100 |
| C.I. Pigment Brown | 2 |

The above mixture was heated to 130° to 140° C. for 30 minutes, fused and kneaded in a roll mill, and was then cooled to room temperature. The thus kneaded mixture was then pulverized and classified, whereby a comparative magnetic toner with a particle size of 5 to 10 μm and a density of 1.6 $g/cm^3$ was obtained.

By use of the thus obtained comparative magnetic toner in the same commercially available copying machine (Trademark "My Ricopy M-10", made by Ricoh Company, Ltd.) as employed in Example 8, copies were made. As a result, clear brown images were obtained. This was because the inorganic magnetic material employed in this comparative magnetic toner was almost colorless.

This magnetic toner was also incorporated in the same copying machine as employed in Example 8, which was modified so as to attain a copy speed of 50 sheets per minute, and copies were made. As a result, the toner was pulverized in the course of the development process because the density of the toner was as high as 1.6 $g/cm^3$, so that the toner was scattered during the copy making process, and the deposition of the toner on the background of images also took place.

EXAMPLE 10

A mixture of the following components was sufficiently stirred and mixed in a Henschel mixer:

| | Parts by Weight |
|---|---|
| Styrene/n-butyl methacrylate copolymer | 100 |
| Quaternary ammonium salt (charge controlling agent) | 2 |
| K—FePc obtained in Example 1 (organic magnetic composition) | 100 |

The above mixture was heated to 130° to 140° C. for 30 minutes, fused and kneaded in a roll mill, and was then cooled to room temperature. The thus kneaded mixture was then pulverized and classified, whereby a magnetic toner with a particle size of 5 to 10 μm and a density of 1.2 $g/cm^3$ was obtained.

By use of the thus obtained magnetic toner in the same commercially available copying machine (Trademark "My Ricopy M-10", made by Ricoh Company, Ltd.) as employed in Example 8, copies were made. As a result, clear blue images were obtained.

Thus, this magnetic toner can be used as a color magnetic toner.

EXAMPLE 11

The following components were mixed and dispersed, whereby an oil magnetic ink was obtained:

| | Parts by Weight |
|---|---|
| Phenolic resin | 25 |
| Spindle oil | 30 |
| Toluene | 13 |
| Carnauba wax | 5 |
| Soybean oil fatty acid | 2 |
| K—FePc obtained in Example 1 (organic magnetic composition) | 5 |

By use of the thus obtained oil magnetic ink, printing was performed on a sheet of coated paper. As a result, clearly printed blue images were obtained. The thus printed blue images can also be read by a magnetic head.

Japanese Patent Application No. 06-054530 filed on Feb. 28, 1994 is hereby incorporated by reference.

What is claimed is:

1. A magnetic ink comprising:

a magnetic composition comprising an alkali-metal-doped tetraazaporphyrin derivative which is prepared by doping a tetraazaporphyrin derivative of formula (I) with an alkali metal, or an alkali-metal-doped porphyrin derivative which is prepared by doping porphyrin derivative of formula (II) with an alkali metal:

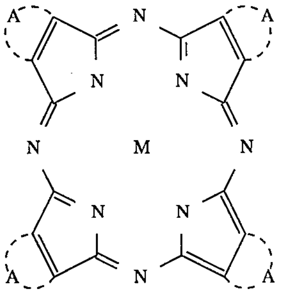

(I)

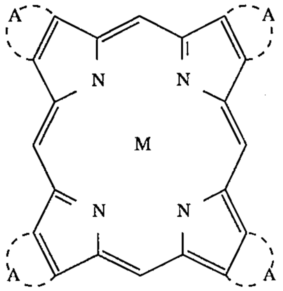

(II)

wherein M represents at least one metal or a metal composition consisting of a plurality of metals; and A represents two individual hydrogen atoms, or a condensation substituent selected from the group consisting of:

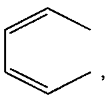

(a)

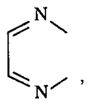

(b)

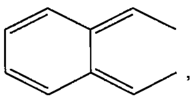

(c)

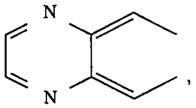

(d)

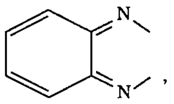

(e)

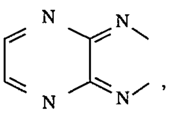

(f)

-continued

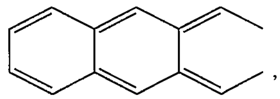

(g)

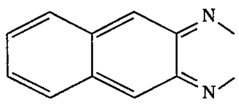

(h)

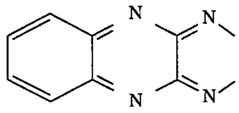

(i)

and

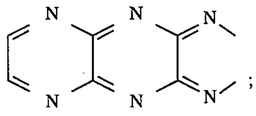

(j)

and a vehicle.

2. The magnetic ink as claimed in claim 1, wherein said condensation substituent represented by A except said hydrogens has at least one substituent selected from the group consisting of a halogen atom, an alkyl group, an alkoxy group, an amino group, a nitro group, an aryl group, a carboxyl group, a carboxylate group, an aralkyl group, an alkenyl group, an aryloxy group, an alkylthio group, and an arylthio group.

3. The magnetic ink as claimed in claim 1, wherein said metal represented by M is selected from the group consisting of Fe, Co, Ni and Mn.

4. The magnetic ink as claimed in claim 1, wherein said metal composition comprising a plurality of metals represented by M is selected from the group consisting of Fe/Co, Fe/Ni, Ni/Co, Fe/Pt, Fe/Cd, Fe/Pb, and Fe/Co/Ni.

5. The magnetic ink as claimed in claim 1, wherein said alkali-metal-doped tetraazaporphyrin derivative and said alkali-metal-doped porphyrin derivative are respectively prepared by doping said tetraazaporphyrin derivative of formula (I) and said porphyrin derivative of formula (II) with one or more kinds of alkali metals, with the total number of the atoms of said alkali metals being set in a range of 1 to 6 per one molecule of each of said tetraazaporphyrin derivative of formula (I) and said porphyrin derivative of formula (II).

6. The magnetic ink as claimed in claim 1, further comprising a coloring agent.

* * * * *

UNITED STATES PATENT AND TRADEMARK OFFICE

CERTIFICATE OF CORRECTION

PATENT NO. : 5,597,405

DATED: : JANUARY 28, 1997

INVENTOR(S) : LEONID S. GRIGORYAN ET AL

It is certified that error appears in the above-identified patent and that said Letters patent is hereby corrected as shown below:

Column 18, Example 9, under "Parts by Weight", the first "100" should be eliminated, so that the "100" comes only after the entire phrase "Styrene/n-butyl methacrylate copolymer."

Signed and Sealed this

Ninth Day of June, 1998

Attest:

BRUCE LEHMAN

Attesting Officer

*Commissioner of Patents and Trademarks*